(12) United States Patent
Li et al.

(10) Patent No.: US 12,476,064 B2
(45) Date of Patent: Nov. 18, 2025

(54) GROUND FAULT CIRCUIT INTERRUPTER INCORPORATING CIRCUIT BREAKER, SHUNT MODULE AND GROUND FAULT DETECTION DEVICE

(71) Applicant: Chengli Li, Suzhou (CN)

(72) Inventors: Chengli Li, Suzhou (CN); Hao Tian, Suzhou (CN); Hongda Liu, Suzhou (CN)

(73) Assignee: Chengli Li, Suzhou (CN)

( * ) Notice: Subject to any disclaimer, the term of this patent is extended or adjusted under 35 U.S.C. 154(b) by 154 days.

(21) Appl. No.: 18/398,140

(22) Filed: Dec. 28, 2023

(65) Prior Publication Data
US 2025/0140503 A1   May 1, 2025

(30) Foreign Application Priority Data

Nov. 1, 2023 (CN) .......................... 202311439564.0
Nov. 1, 2023 (CN) .......................... 202322946256.9

(51) Int. Cl.
| | |
|---|---|
| *H01H 83/04* | (2006.01) |
| *H01H 71/02* | (2006.01) |
| *H01H 71/04* | (2006.01) |
| *H01H 71/08* | (2006.01) |
| *H01H 71/58* | (2006.01) |
| *H02H 1/00* | (2006.01) |
| *H02H 3/16* | (2006.01) |

(52) U.S. Cl.
CPC .......... *H01H 83/04* (2013.01); *H01H 71/025* (2013.01); *H01H 71/04* (2013.01); *H01H 71/08* (2013.01); *H01H 71/58* (2013.01); *H02H 1/0007* (2013.01); *H02H 3/16* (2013.01)

(58) Field of Classification Search
CPC ...... H01H 83/04; H01H 71/025; H01H 71/04; H01H 71/08; H01H 71/58; H02H 1/0007; H02H 3/16
USPC .......................................................... 361/42
See application file for complete search history.

(56) References Cited

U.S. PATENT DOCUMENTS

| | | | |
|---|---|---|---|
| 6,040,746 A * | 3/2000 | Maloney ................ | H01H 71/46 335/13 |
| 11,282,663 B1 * | 3/2022 | Kawale ............. | H01H 71/0271 |

(Continued)

FOREIGN PATENT DOCUMENTS

| | | | | |
|---|---|---|---|---|
| CA | 3020005 A1 * | 4/2019 | ............. | H05K 1/165 |
| CA | 3091364 A1 * | 3/2021 | ........... | H01H 83/226 |

*Primary Examiner* — Dharti H Patel
(74) *Attorney, Agent, or Firm* — Chen Yoshimura LLP

(57) ABSTRACT

A ground fault circuit interrupter includes a circuit breaker for connecting and disconnecting an electrical connection between an input end and an output end of a plurality of power supply lines, a shunt module coupled to the circuit breaker and for driving the circuit breaker to disconnect the electrical connection; a ground fault detection device coupled to the shunt module and having a detector coil opening on its exterior housing configured to accommodate the power supply lines to passing through, for detecting a ground fault signal on the output end of the power supply lines and outputting a control signal to the shunt module in response thereto, wherein the shunt module drives the circuit breaker to disconnect the electrical connection in response to the control signal. The ground fault circuit interrupter includes fastening devices that join the ground fault detection device and the circuit breaker to each other.

18 Claims, 19 Drawing Sheets

(56) References Cited

U.S. PATENT DOCUMENTS

| | | | |
|---|---|---|---|
| 11,817,282 B2* | 11/2023 | Hiremath | H05K 5/0026 |
| 2003/0107854 A1* | 6/2003 | Mason, Jr. | H02H 1/0015 |
| | | | 361/42 |
| 2007/0030608 A1* | 2/2007 | Baldwin | H01H 83/04 |
| | | | 361/42 |
| 2008/0151463 A1* | 6/2008 | Dwyer | H01H 71/121 |
| | | | 361/186 |
| 2009/0205941 A1* | 8/2009 | Watford | H01H 71/0271 |
| | | | 200/337 |
| 2010/0060469 A1* | 3/2010 | Hetzmannseder | ............ |
| | | | G01R 31/3272 |
| | | | 340/639 |
| 2011/0216453 A1* | 9/2011 | Haines | H02H 9/00 |
| | | | 361/49 |
| 2017/0309431 A1* | 10/2017 | Hiremath | H01H 83/144 |
| 2018/0053616 A1* | 2/2018 | Chen | H01H 83/226 |
| 2020/0035436 A1* | 1/2020 | Packard | H01H 83/04 |
| 2020/0136365 A1* | 4/2020 | Courson | H02H 1/0015 |

\* cited by examiner

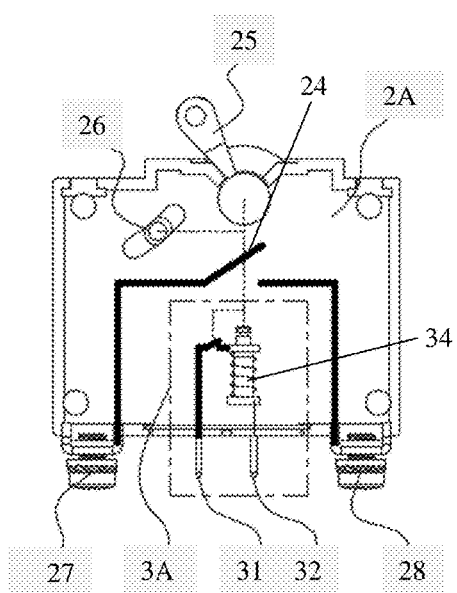
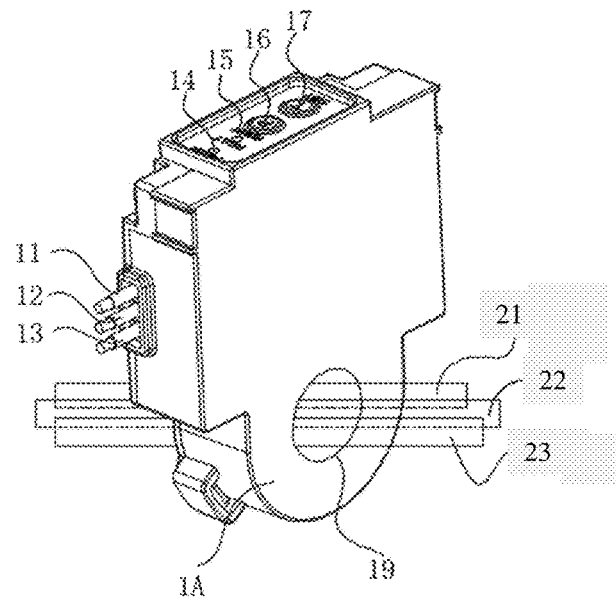
Fig. 9A
Fig. 9B
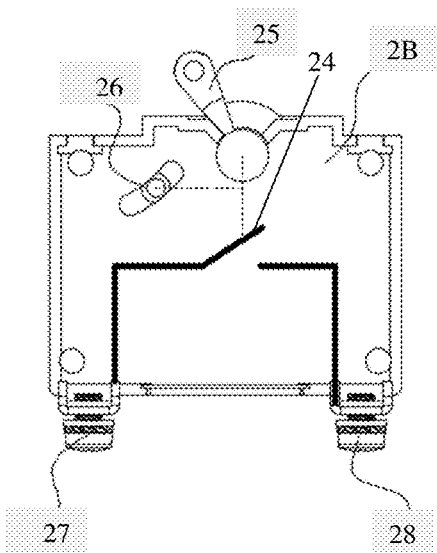
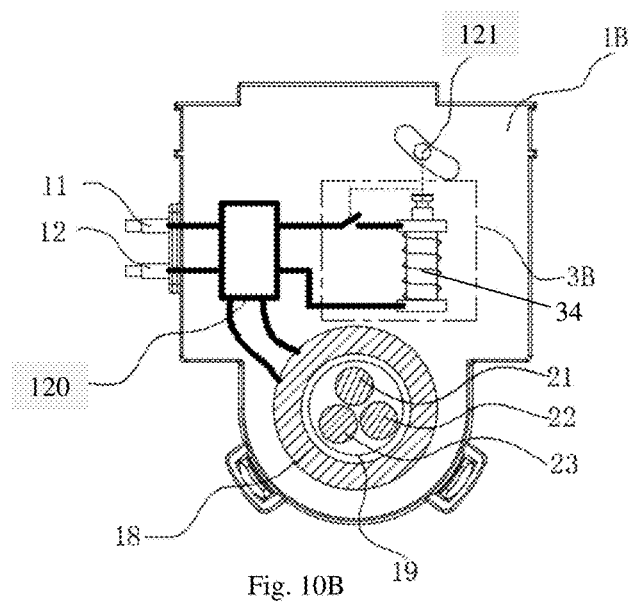
Fig. 10A
Fig. 10B

GROUND FAULT CIRCUIT INTERRUPTER INCORPORATING CIRCUIT BREAKER, SHUNT MODULE AND GROUND FAULT DETECTION DEVICE

BACKGROUND OF THE INVENTION

This invention relates to circuit breakers, and in particular, it relates to ground fault circuit interrupters.

Conventional circuit breakers cannot disconnect power in response to leakage fault, so they present certain risk of electrical shock and cause safety concerns. Conventional ground fault circuit interrupter devices typically integrate the ground fault detection circuit portion inside the body of the circuit interrupter (circuit breaker), which reduces the flexibility during installation and use of the ground fault circuit interrupter devices.

Further, there is a lack of ground fault protection products on the market suitable for large current applications.

SUMMARY OF THE INVENTION

Therefore, there is a need for an improved ground fault circuit interrupter device.

To solve the above problems, embodiments of the present invention provide a ground fault circuit interrupter (GFCI) device that combines a circuit breaker and a ground fault detection device.

In one aspect, the present invention provides a ground fault circuit interrupter, which includes: a circuit breaker, configured to connect and disconnect an electrical connection between an input end and an output end of a plurality of power supply lines; a shunt module, coupled to the circuit breaker and configured to drive the circuit breaker to disconnect the electrical connection; a ground fault detection device, coupled to the shunt module, having a detector coil opening on its exterior housing configured to accommodate the power supply lines to passing through, wherein the ground fault detection device is configured to detect a ground fault signal on the output end of the power supply lines and to output a control signal to the shunt module in response to detecting the ground fault signal, wherein the shunt module is configured to drive the circuit breaker to disconnect the electrical connection in response to the control signal; and at least one fastening device configured to join the ground fault detection device and the circuit breaker to each other.

In some embodiments, the circuit breaker defines a top side, and wherein the detector coil opening is located near a bottom side opposite the top side, or located on a lateral side because the top and bottom sides.

In some embodiments, the at least one fastening device includes one or more bolts configured to affix the fault detection device and the circuit breaker to each other.

In some embodiments, the at least one fastening device includes one or more first fasteners, each first fastener having a first end clamped to a first recess of the circuit breaker, and a second end fixedly connected to the ground fault detection device, configured to limit relative movements of the circuit breaker and the ground fault detection device in a first direction.

In some embodiments, the at least one fastening device further includes one or more second fasteners, each second fastener having a first end clamped to a second recess of the circuit breaker, and a second end fixedly connected to the ground fault detection device, configured to limit relative movements of the circuit breaker and the ground fault detection device in a second direction.

In some embodiments, the shunt module is integrated inside an exterior housing of the circuit breaker.

In some embodiments, the shunt module is integrated inside the exterior housing of the ground fault detection device.

In some embodiments, the shunt module is a separate module having an exterior housing separate from an exterior housing of the circuit breaker and the exterior housing of the ground fault detection device.

In some embodiments, the ground fault detection device includes a fault display module configured to generate an alarm indication in response to detecting the ground fault signal.

In some embodiments, the ground fault detection device further includes a fault detection reset module, which includes a reset button for clearing the alarm indication.

In some embodiments, the ground fault detection device further includes a ground fault signal detection module, a ground fault signal simulation module, a ground fault signal processing module, and a grounded power input module.

In some embodiments, the ground fault signal simulation module includes at least one test button, configured to generate a simulated ground fault signal in response to the test button being manually pressed.

In some embodiments, the ground fault signal processing module includes a printed circuit board, wherein in response to detecting the ground fault, the ground fault signal processing module controls the shunt module to drive the circuit breaker to disconnect the electrical connection.

In some embodiments, the grounded power input module is configured to supply a working power for the grounding fault signal processing module.

In some embodiments, the exterior housing of the ground fault detection device includes: a cover plate; and a base coupled to the cover plate, the base defining: a first cavity area configured to accommodate the ground fault signal detection module; a second cavity area configured to accommodate the ground fault signal processing module; a third cavity area configured to accommodate the ground power input module; and a window area configured to accommodate the fault display module and the ground fault signal simulation module.

In some embodiments, the ground fault signal detection module includes at least one detection coil configured to detect the ground fault signals.

In some embodiments, the circuit breaker is single-pole or multi-pole circuit breaker.

In some embodiments, the circuit breaker includes at least one installation device.

In embodiments of the present invention, by using a fastening device to combine the ground fault detection device and the circuit breaker into one device, the device can provide safety to user (e.g., in large current applications), as well as providing flexibility in installation and use.

BRIEF DESCRIPTION OF DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols.

FIGS. 9A and 9B respectively illustrate the structures of the circuit breaker incorporating a shunt module and the ground fault detection device corresponding to the embodiment of FIG. 1A.

FIGS. 10A and 10B respectively illustrate the structures of the circuit breaker and the ground fault detection device incorporating a shunt module corresponding to the embodiment of FIG. 1B.

DETAILED DESCRIPTION OF THE INVENTION

Figure 1A:
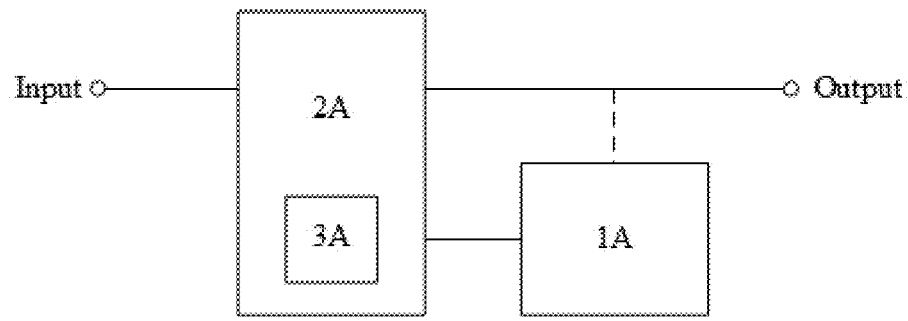
FIG. 1A is a block diagram showing a ground fault circuit interrupter according to an embodiment of the present invention.

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims. In the following descriptions, directional terms such as up, down, left, right, front, rear, etc. are relative terms with reference to the orientation of the drawing figures; these terms are used for better understanding of the invention, but they do not limit the scope of the invention.

Before describing the embodiments, some terms used in this disclosure are defined here to help the reader better understand this disclosure.

In this disclosure, terms such as "a" and "one" do not limit the quantity, and refers to "at least one".

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc. In this disclosure, the above terms do not necessarily refer to the same embodiments. Further, the various features, structures, materials or characteristics may be suitably combined in any of the one or more embodiments. Those of ordinary skill in the art may combine the various embodiments and various characteristics of the embodiments described herein when they are not contrary to each other.

As discussed earlier, conventional ground fault protection devices typically integrate the ground fault detection portions inside the shell of the circuit interrupter; such devices lack flexibility during installation and use. Further, most currently available ground fault circuit interrupters are for protecting home appliances rated for low current (20 A or below) and similar use scenarios; ground fault protection devices for large current applications are often not available.

To solve the above problems, embodiments of the present invention provide a combination ground fault circuit interrupter (GFCI) device that combines a circuit breaker and a ground fault detection device, which includes: an input end; an output end; a circuit breaker, configured to control the electrical connection between the input end and output end; a ground fault detection device, coupled to the circuit breaker, configure to detect a ground fault at the output end; and a fastening device, configured to join the ground fault detection device and the circuit breaker to each other; wherein the ground fault detection device is configured to drive the circuit breaker to disconnect the electrical connection between the input and output ends in response to detecting a ground fault.

In some examples, the GFCI device further includes a shunt module, configured to drive the circuit breaker to disconnect the electrical connection between the input and output ends. The shunt module may be integrated inside the ground fault detection device, inside the circuit breaker, or it may be provided as a separate module.

FIG. 1A is a block diagram showing an exemplary ground fault circuit interrupter 10A according to an embodiment of the present invention. The device 10A includes an input end, an output end, a ground fault detection device 1A, and a circuit breaker 2A coupled to the ground fault detection device 1A. The circuit breaker 2A is configured to control the electrical connection between the input and output ends. The ground fault detection device 1A is configured to detect a ground fault at the output end, and to drive the circuit breaker 2A to disconnect the electrical connection between the input and output ends in response to detecting a ground fault. The device 10A further includes a shunt module 3A, which is integrated inside the circuit breaker 2A, and configured to drive the circuit breaker 2A to disconnect the electrical connection between the input and output ends.

Figure 1B:
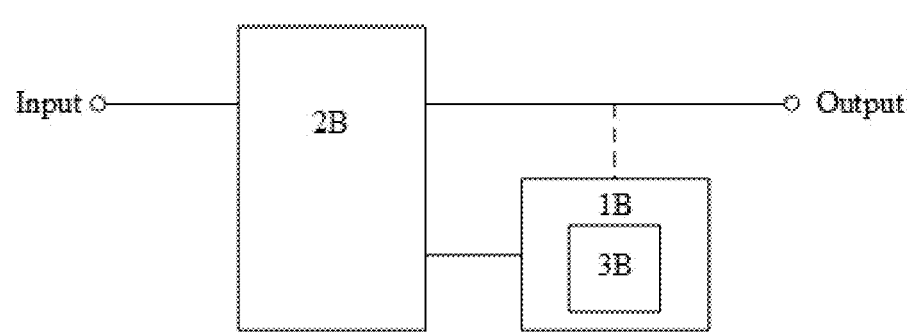
FIG. 1B is a block diagram showing a ground fault circuit interrupter according to another embodiment of the present invention.

FIG. 1B is a block diagram showing a ground fault circuit interrupter 10B according to another embodiment of the present invention. The device 10B includes an input end, an output end, a ground fault detection device 1B, and a circuit breaker 2B coupled to the ground fault detection device 1B. The circuit breaker 2B is configured to control the electrical connection between the input and output ends. The ground fault detection device 1B is configured to detect a ground fault at the output end, and to drive the circuit breaker 2B to disconnect the electrical connection between the input and output ends in response to detecting a ground fault. The device 10B further includes a shunt module 3B, which is integrated inside the ground fault detection device 1B, and configured to drive the circuit breaker 2B to disconnect the electrical connection between the input and output ends.

Figure 1C:
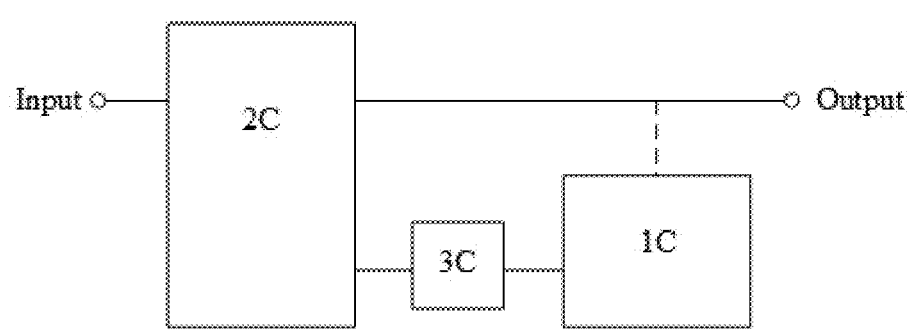
FIG. 1C is a block diagram showing a ground fault circuit interrupter according to yet another embodiment of the present invention.

FIG. 1C is a block diagram showing a ground fault circuit interrupter 10C according to another embodiment of the present invention. The device 10C includes an input end, an output end, a ground fault detection device 1C, and a circuit breaker 2C coupled to the ground fault detection device 1C. The circuit breaker 2C is configured to control the electrical connection between the input and output ends. The ground fault detection device 1C is configured to detect a ground fault at the output end, and to drive the circuit breaker 2C to disconnect the electrical connection between the input and output ends in response to detecting a ground fault. The device 10C further includes a shunt module 3C, which is a separate module and coupled between the ground fault detection device 1C and the circuit breaker 2C, and configured to be controlled by the ground fault detection device 1C to drive the circuit breaker 2C to disconnect the electrical connection between the input and output ends.

Figure 2A:
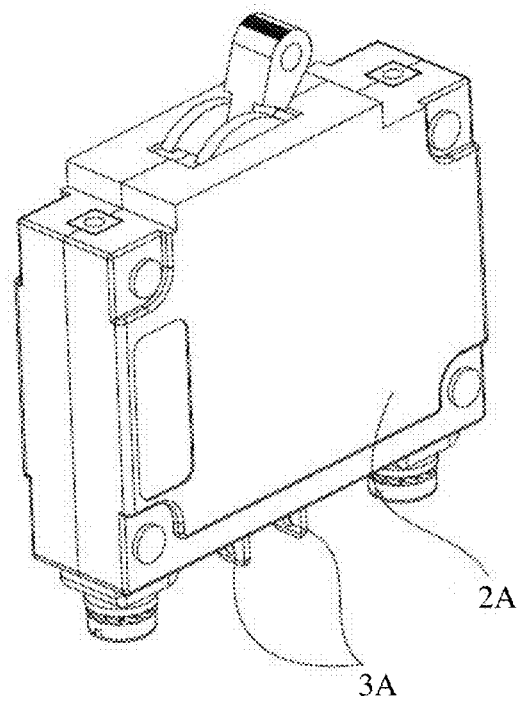
FIG. 2A is an exterior view of a combination shunt module and circuit breaker corresponding to the embodiment of FIG. 1A.

FIG. 2A is an exterior view of a combination shunt module and circuit breaker according to an embodiment of the present invention, corresponding to the device 10A shown in FIG. 1A. As shown in FIGS. 1A and 2A, the shunt module 3A is integrated inside the exterior housing of the circuit breaker 2A, and the integrated unit is detachably connected to the ground fault detection device 1A, so that when the ground fault detection device 1A detects a ground fault, it can drive the shunt module 3A to act, and the action of the shunt module 3A drives the circuit breaker 2A to disconnect the electrical connection between the input and output ends.

FIGS. 9A and 9B respectively illustrate the structures of the circuit breaker incorporating a shunt module and the ground fault detection device of this embodiment. The circuit breaker 2A (FIG. 9A) includes a mechanical switch 24 configured to connect or disconnect the electrical connection between the input end 28 and output end 27 of the power supply lines. The switch 24 may be manually opened and closed by a push handle 25 which is partially exposed to the exterior of the circuit breaker 2A. The shunt module 3A integrated within the circuit breaker 2A includes a solenoid 34 which is configured to open to close the switch 24. The ground fault detection device 1A (FIG. 9B) includes a ground fault detection circuit configured to detect ground fault on one or more of the power supply lines 21, 22 and 23 which pass through a detector coil opening 19 of the ground fault detection device 1A. The detector coil opening 19 is an opening of the exterior housing of the ground fault detection device 1A, configured to allow the power supply lines 21, 22 and 23 to pass through it when the ground fault circuit interrupter is installed. The ground fault detection device 1A does not have a solenoid, but has an output conductor 13 coupled to the ground fault detection circuit to output a control signal (e.g. a drive current for the solenoid). Conductor 13 is electrically coupled to one of the two ends 31 and 32 of the solenoid of the shunt module 3A, the other end being coupled to one of the power supply lines. When the ground fault detection device 1A detects a ground fault, it outputs the control signal to the shunt module 3A, driving the solenoid to open the switch 24. Conductors 11 and 12 of the ground fault detection device 1A are respectively coupled to the power supply lines. The structure of the ground fault detection device 1A, including the various control buttons and indicators 14-17, will be described in more detail later.

Figure 2B:
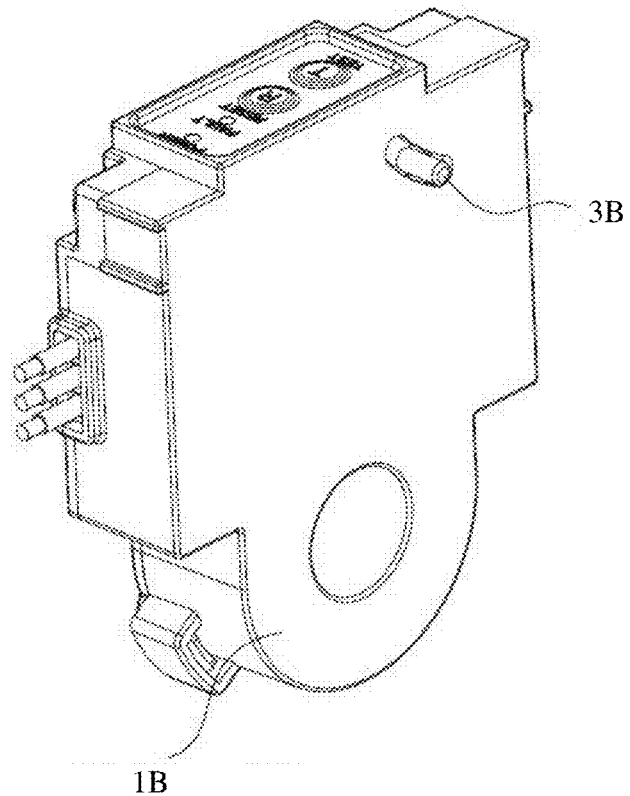
FIG. 2B is an exterior view of a combination shunt module and ground fault detection device corresponding to the embodiment of FIG. 1B.

FIG. 2B is an exterior view of a combination shunt module and ground fault detection device according to an embodiment of the present invention, corresponding to the device 10B shown in FIG. 1B. As shown in FIGS. 1B and 2B, the shunt module 3B is integrated inside the exterior housing of the ground fault detection device 1B, and the integrated unit is detachably connected to the circuit breaker 2B, so that when the ground fault detection device 1B detects a ground fault, it can drive the shunt module 3B to act, and the action of the shunt module 3B drives the circuit breaker 2B to disconnect the electrical connection between the input and output ends.

FIGS. 10A and 10B respectively illustrate the structures of the circuit breaker and the ground fault detection device incorporating a shunt module of this embodiment. The circuit breaker 2B of this embodiment has a switch 24 and a push handle 25 similar to those in FIG. 9A. The circuit breaker 2B does not include a shunt module (solenoid), but has a mechanical linkage component 26 mechanically linked to the switch 24 to open and close the switch. The ground fault detection device 1B includes a ground fault detection circuit 120 configured to detect ground fault on one or more of the power supply lines 21, 22 and 23 which pass through an exterior opening 19 and a detector coil 18. When the ground fault detection circuit 120 detects a ground fault, it outputs a control signal (e.g. a drive current) to the shunt module 3B (solenoid 34) that is integrated with the ground fault detection device 1B, causing the solenoid to move a mechanical linkage component 121 in a predefined direction. The ground fault detection device 1B and the circuit breaker 2B are mechanical coupled to each other by the mechanical linkage component 121 of the ground fault detection device 1B and a corresponding mechanical linkage component 26 of the circuit breaker 2B, so that the movement of the solenoid (shunt module 3A) within the ground fault detection device 1B causes the switch 24 of the circuit breaker 2B to open. The mechanical linkage components 26 and 121 may have any suitable structure. For example, the mechanical linkage component 26 may be a lever with a hole exposed by an arc shaped opening on the housing of the circuit breaker 2B, and the mechanical linkage component 121 may be a shaft extending through an arc shaped opening out of the housing of the ground fault detection device 1B and inserted into the hole 26 when the ground fault detection device 1B and circuit breaker 2B are assembled together. Alternatively, the mechanical linkage component 121 may be a lever with a hole and the mechanical linkage component 26 may be a shaft. Other alternative structure of the mechanical linkage may include a push shaft that moves in a direction along the shaft, etc. (Note that the circuit breaker 2A shown in FIG. 9A is also depicted as having a mechanical linkage component 26, but it is not used in that embodiment.)

Figure 2C:
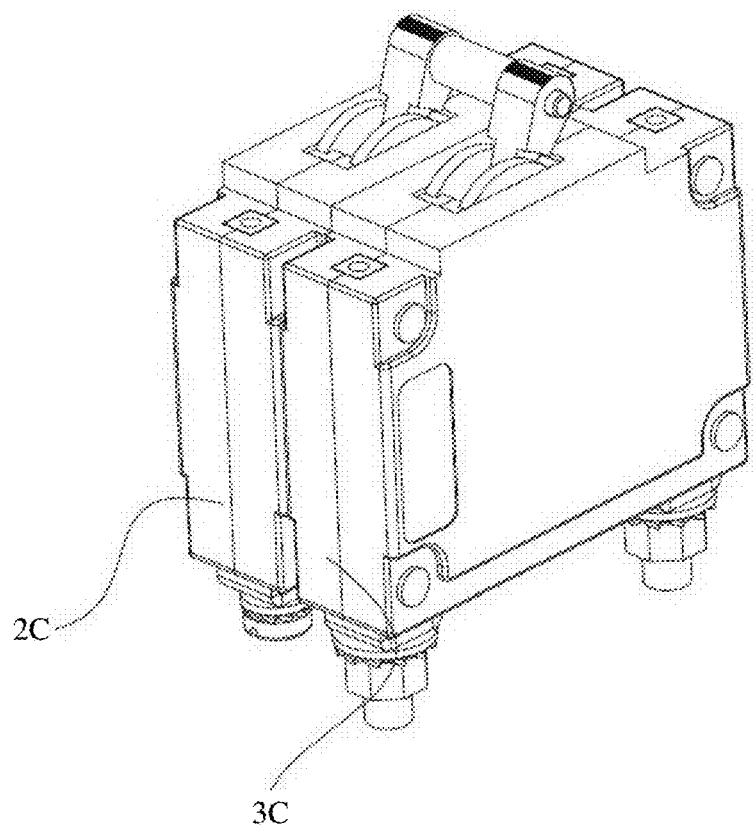
FIG. 2C is an exterior view of a shunt module and a circuit breaker linked together corresponding to the embodiment of FIG. 1C.

FIG. 2C is an exterior view of a shunt module and a circuit breaker according to an embodiment of the present invention, corresponding to the device 10C shown in FIG. 1C. As shown in FIGS. 1C and 2C, the shunt module 3C is a separate module, with its own the exterior housing separate from the exterior housing of the circuit breaker 2C and the exterior housing of the ground fault detection device 1C, and is affixed to circuit breaker 2C, and coupled to the circuit breaker 2C and ground fault detection device 1C (not shown in FIG. 2C), so that when the ground fault detection device 1C detects a ground fault, it can drive the shunt module 3C to act, and the action of the shunt module 3C drives the circuit breaker 2C to disconnect the electrical connection between the input and output ends.

Figure 11A:
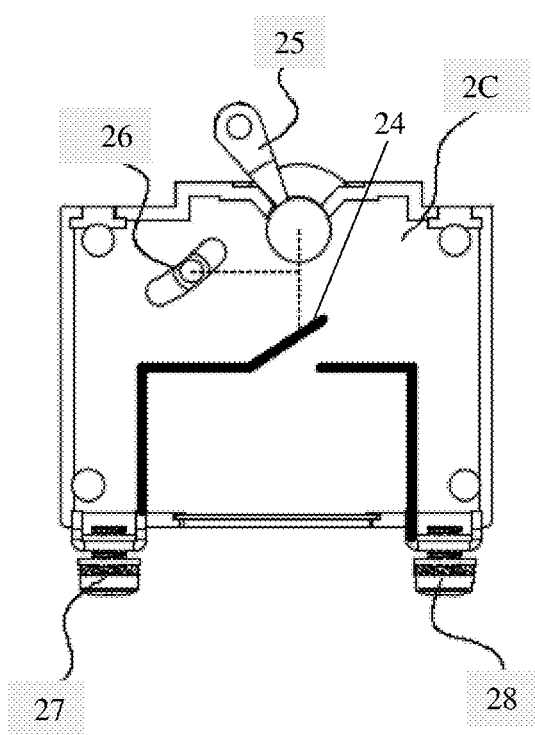
FIGS. 11A, 11B and 11C respectively illustrate the structures of the circuit breaker, the shunt module, and the ground fault detection device corresponding to the embodiment of FIG. 1C.
Figure 11B:
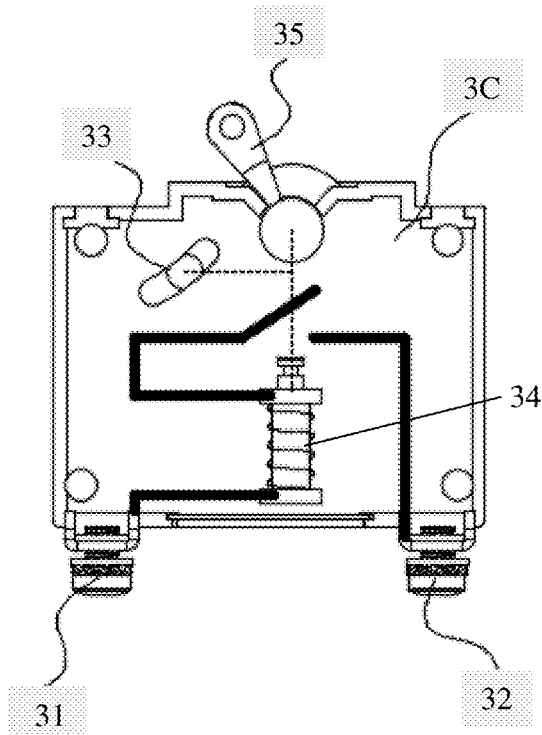
Figure 11C:
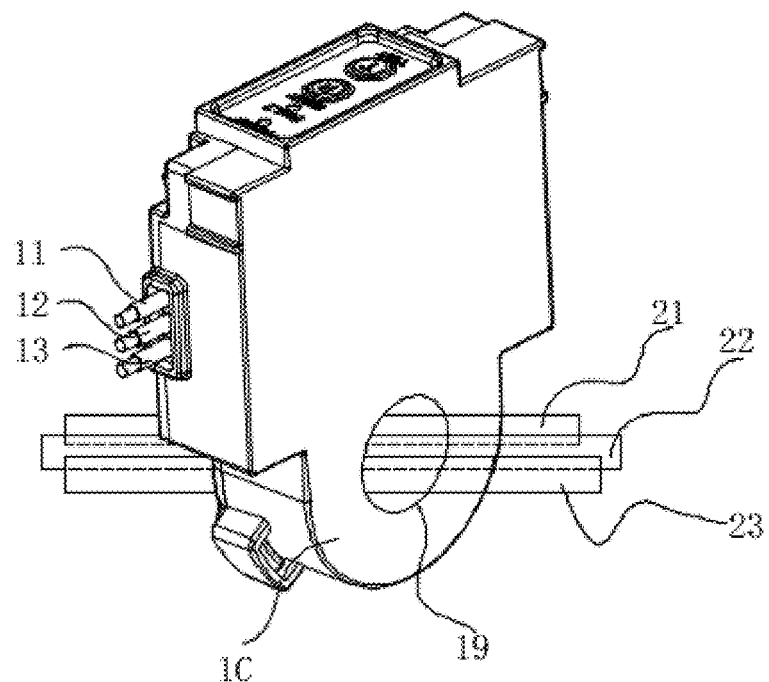

FIGS. 11A, 11B and 11C respectively illustrate the structures of the circuit breaker, the shunt module, and the ground fault detection device of this embodiment. The ground fault detection device 1C (FIG. 11C) is the same as the ground fault detection device 1A of the embodiment of FIG. 9B. The circuit breaker 2C (FIG. 11A) is the same as the circuit breaker 2B of the embodiment of FIG. 10A. The shunt module 3C (FIG. 11B), as separate unit, includes a solenoid, electrically coupled to the ground fault detection device 1C via conductor 31 or 32 of the shunt module 3C and conductor 13 of the ground fault detection device 1C. The circuit breaker 2C and shunt module 3C are mechanically linked together, either by tying the push handle 25 of the circuit breaker 2C to a similarly shaped push handle 35 of the shunt module 3C (see also FIG. 3A), or by using the mechanical linkage component 26 of the circuit breaker 2C and a mechanical linkage component 33 of the shunt module 3C which has a structure similar to the mechanical linkage component 121 of the embodiment of FIG. 10B, or both. When the ground fault detection device 1C detects a ground fault, it outputs a control signal (e.g. a drive current) to the shunt module 3C, causing the solenoid to move either the push handle 35 or the mechanical linkage component 33 or both, which in turn causes the switch 24 of the circuit breaker 2C to open.

The structures of the ground fault circuit interrupter devices are described in more detail with reference to FIGS. 3A-8C.

Figure 3A:
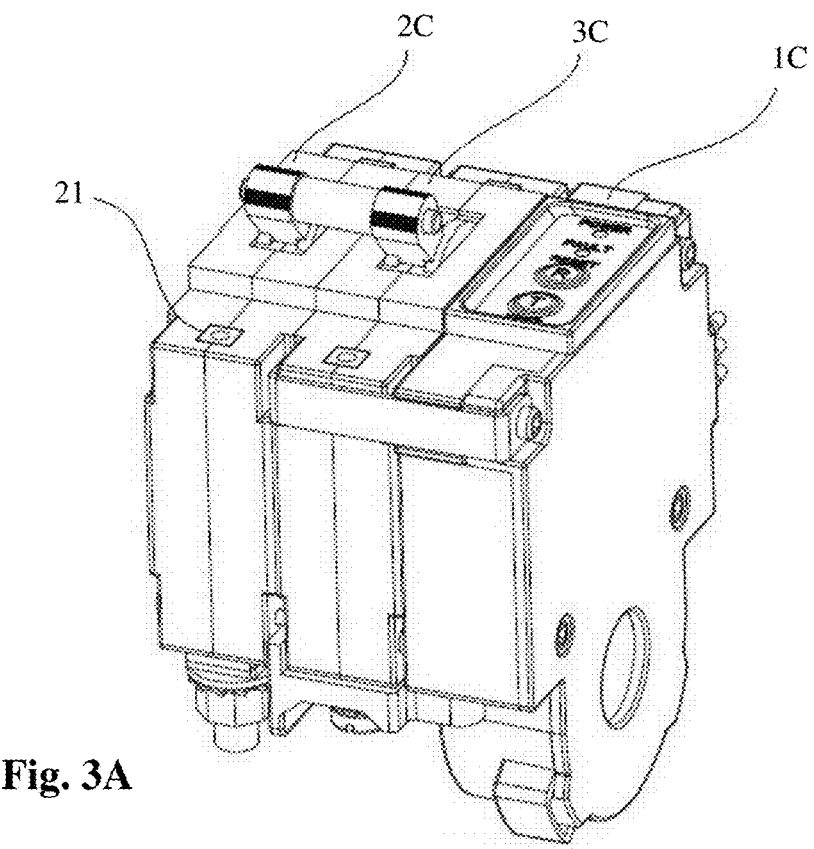
FIG. 3A is an exterior view of a ground fault circuit interrupter corresponding to the embodiment of FIG. 1C.
Figure 3B:
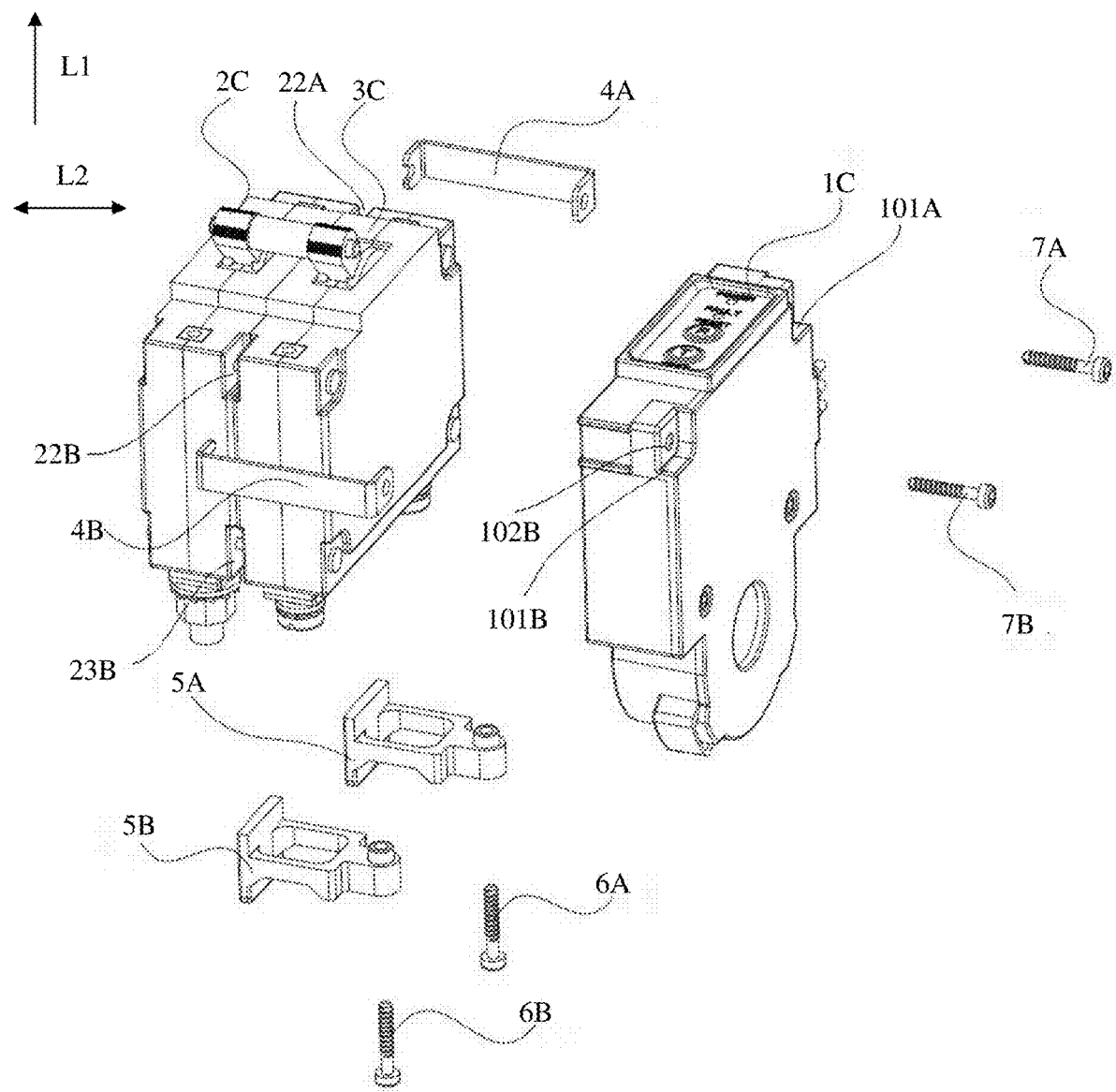
FIG. 3B is an exploded view of the ground fault circuit interrupter of FIG. 3A.

FIG. 3A is an exterior view of the ground fault circuit interrupter 10C corresponding to FIG. 1C, according to an embodiment of the present invention. FIG. 3B is an exploded view of the ground fault circuit interrupter 10C of FIG. 3A from one viewing angle, and FIG. 3C is an exploded view of the ground fault circuit interrupter 10C of FIG. 3A from another viewing angle.

Figure 3C:
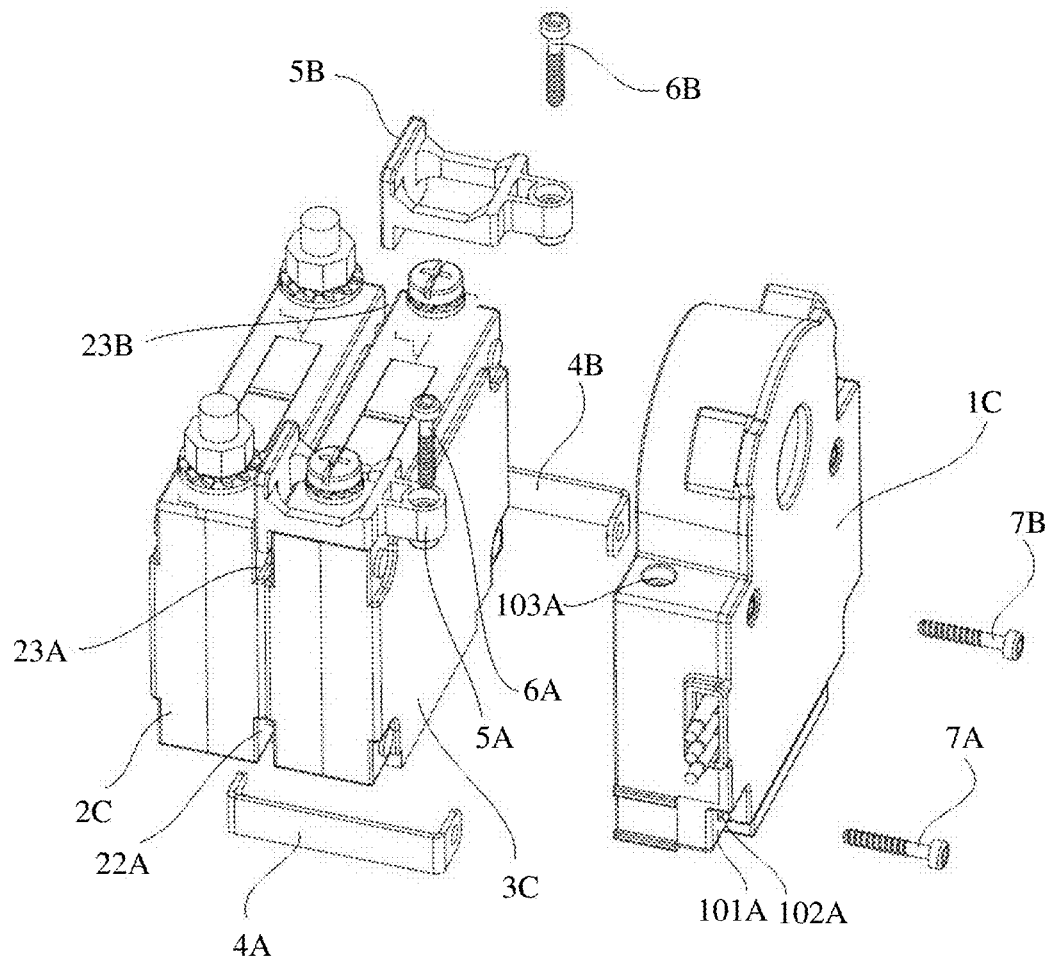
FIG. 3C is an exploded view of the ground fault circuit interrupter of FIG. 3A from another viewing angle.

As shown in FIGS. 3A-3C, the device 10C includes a fastening device, which fastens the ground fault detection device 1C, the circuit breaker 2C and the shunt module 3C together. For example, the fastening device may include one or more first fasteners 4A and 4B, and/or one or more second fasteners 5A and 5B.

Figure 4:
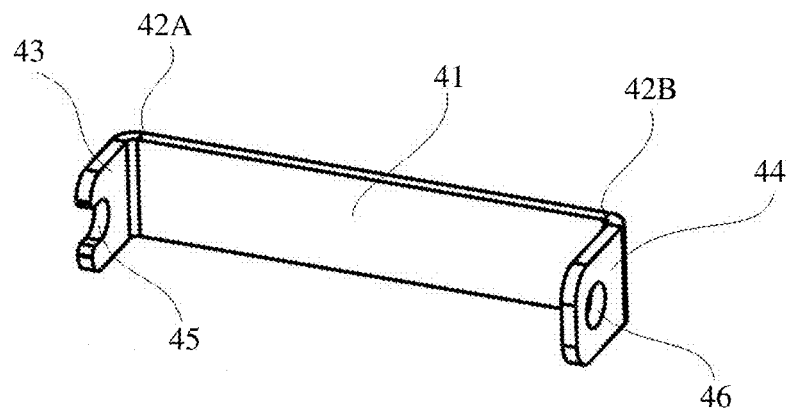
FIG. 4 illustrates a first fastener according to an embodiment of the present invention.

The first fastener according to an embodiment of the present invention is illustrated in FIG. 4. Each first fastener (4A, 4B) includes a body 41, a first end (a tab) 43 that extends from a first side 42A of the body 41 at an angle relative to the body (e.g., a perpendicular angle or another angles), and a second end (a tab) 44 that extends from a second side 42B of the body 41 at an angle relative to the body (e.g., a perpendicular angle or another angles). As shown in FIGS. 3A-3C, the first end 43 of each first fastener (4A, 4B) is clamped to a first recess (22A, 22B) of the circuit breaker 2C, and the second end 44 of each first fastener (4A, 4B) is fixedly connected to the ground fault detection device 1C, to limit the relative movement of the circuit breaker 2C (and the combination of shunt module 3C) and the ground fault detection device 1C in a first direction. The first recess (22A, 22B) of the circuit breaker 2C may be located on the side of the circuit breaker 2C (for example, near the top surface) and adjacent to the shunt module 3C. As shown in FIG. 4, the first end 43 of each first fastener (4A, 4B) may be provided with a notch 45 to adapt to the shape of the first recess (22A, 22B).

The second end 44 of each first fastener (4A, 4B) may be provided with an opening 46, and the second end 44 may be inserted, for example, into the recess (101A, 101B) of the ground fault detection device 1C (for example, the recess is located on the side of the ground fault detection device 1C and is not adjacent to the circuit breaker 2C and the shunt module 3C), so that the opening 46 exposes a fixing hole in the recess (101A, 101B) (such as the hole 102B, and the hole opposite the hole 102B (not shown)). The second end 44 is fixedly connected to the ground fault detection device 1C by corresponding fixing component (7A, 7B), which passes through the opening 46 of the second end 44 and is inserted into the fixing hole of the ground fault detection device 1C, along a first installation direction (such as perpendicular to the side of the ground fault detection device 1C or at other angles to the side). For example, the fixing components (7A, 7B) (which may be screws, rivets, bolts, etc.) may have external threads, and the fixing holes may have internal threads, allowing the fixing components and the fixing holes to be connected together through threaded means. It should be understood that the second end of the first fastener may also be fixedly connected to the ground fault detection device using various fixed connection methods known in the art, such as, without limitation, threaded connection, rivet connection, pin connection, etc.

As described above, the first end of the first fastener is clamped to the combination of the circuit breaker 2C and the shunt module 3C, and the second end of the first fastener is fixed to the ground fault detection device 1C, thereby preventing relative movement of the ground fault detection device 1C and the combination of the circuit breaker 2C and the shunt module 3C in the first direction, such as a left-and-right movement (as indicated by left-and-right arrow L2) and an upward movement (as indicated by upward arrow L1).

Figure 5A:
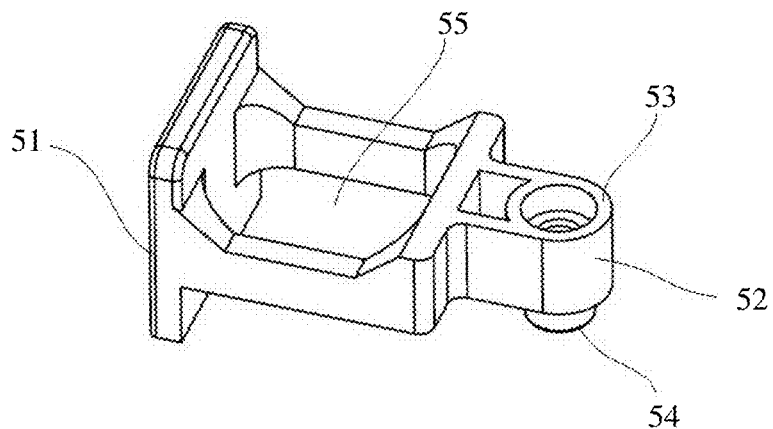
FIG. 5A illustrates a second fastener according to an embodiment of the present invention.
Figure 5B:
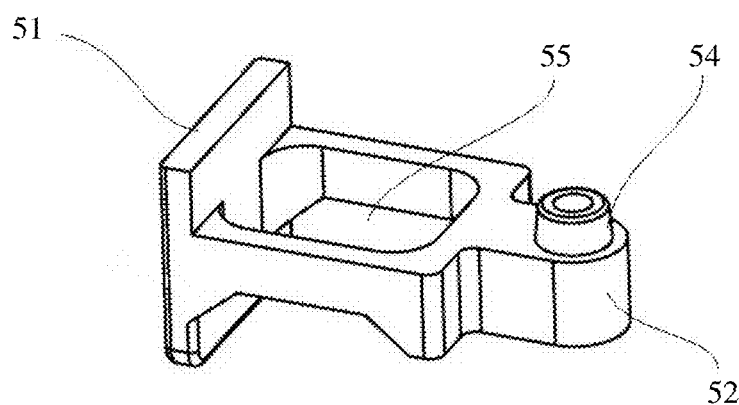
FIG. 5B illustrates the second fastener from another viewing angle.

FIGS. 5A and 5B illustrate a second fastener according to an embodiment of the present invention from different viewing angles. Each second fastener (5A, 5B) includes a first end 51 and a second end 52. As shown in FIGS. 3A to 3C, the first end 51 of each second fastener (5A, 5B) is clamped to the second recess (23A, 23B) of the circuit breaker 2C, and the second end 52 of each second fastener (5A, 5B) is fixedly connected to the ground fault detection device 1C, so as to limit the relative movement of the circuit breaker 2C (and the combination with the shunt module 3C) and the ground fault detection device 1C in the second direction. The second recess (23A, 23B) of the circuit breaker 2C may be located on a side of the circuit breaker 2C (for example, near the bottom surface) and adjacent to the shunt module 3C. As shown in FIGS. 5A and 5B, the second end 52 of each second fastener (5A, 5B) may be provided with an opening that extends from the first side 53 to the second side 54. Fixing components (6A, 6B) pass through the opening of the second end 52 and are inserted in the second installation direction (such as perpendicular to the bottom surface of the ground fault detection device 1C or at other angles to the bottom surface) into the fixing hole of the ground fault detection device 1C (such as hole 103A, hole opposite hole 103A (not shown)). The fixing hole may be provided on the bottom surface of the grounding fault detection device 1C. For example, the second side 54 of the second end 52 of each second fastener (5A, 5B) may be a protrusion, so as to be positioned to the fixing hole of the ground fault detection device 1C. The fixing components (6A, 6B) (such as screws, bolts, etc.) may have external threads, and the fixing holes may have internal threads, allowing the fixing components and fixing holes to be connected together through threaded means. It should be understood that various fixed connection methods known in the art (such as, without limitation, threaded connection, rivet connection, pin connection, etc.) may also be used to fixedly connect the second end of the second fastener to the ground fault detection device.

As described above, the first end of the second fastener is clamped together with the combination of the circuit breaker 2C and the shunt module 3C, and the second end of the second fastener is fixed together with the ground fault detection device 1C, thereby preventing the relative movement of the ground fault detection device 1C and the combination of the circuit breaker 2C and the shunt module 3C in the second direction, such as the downward movement (such as in the opposite direction to the upward direction L1).

As shown in FIGS. 5A and 5B, each second fastener (5A, 5B) may also include a cavity arranged between the first end 51 and the second end 52 to accommodate a bottom mounting component of the shunt module 3C (such as a cross screw shown in the figure) to pass through.

Using both the first and second fasteners, the circuit breaker 2C (and its combination with the shunt module 3C) and ground fault detection device 1C can be firmly connected together and their movement relative to each other can be restricted.

It is noted that some commercially available circuit breakers and shunt modules have exterior shapes as shown in FIGS. 3A-C, where recesses 22A and 22B are provided to accommodate screw heads, nuts, etc. that are used to assemble the housings of these units or to joint multiple units together. The ground fault circuit interrupter described above takes advantage of these existing exterior features, by providing recesses 101B with holes 102B on the ground fault detection device 1C at locations corresponding to the recesses 22A and 22B, so that the first fasteners 4A and 4B may be used to fasten the ground fault detection device 1C to the circuit breaker 2C or shunt module 3C, where the notch 45 on one end of the first fastener can adapt to the existing screw head or bolt head. Similarly, the shape of the second fasteners 5A, 5B are adapted to accommodate the shape of the electrical terminals and recesses of the shunt module 3C.

As shown in FIG. 3A, the circuit breaker 2C includes at least one installation device 21. The installation device 21 may be disposed at the top surface of circuit breaker 2C. For example, the circuit breaker 2C (and the combination with the shunt module 3C), and the ground fault detection 1C fixedly connected to it, may be fixedly connected to a face plate by the installation device 21, to expose at least the operating and display parts of the circuit breaker 2C (and the combination of shunt module 3C) and the ground fault detection 1C (such as electrical switches, fault indicators, analog buttons, reset buttons, etc.). Similarly, the shunt module 3C and the ground fault detection device 1C may include the at least one installation device.

Figure 6:
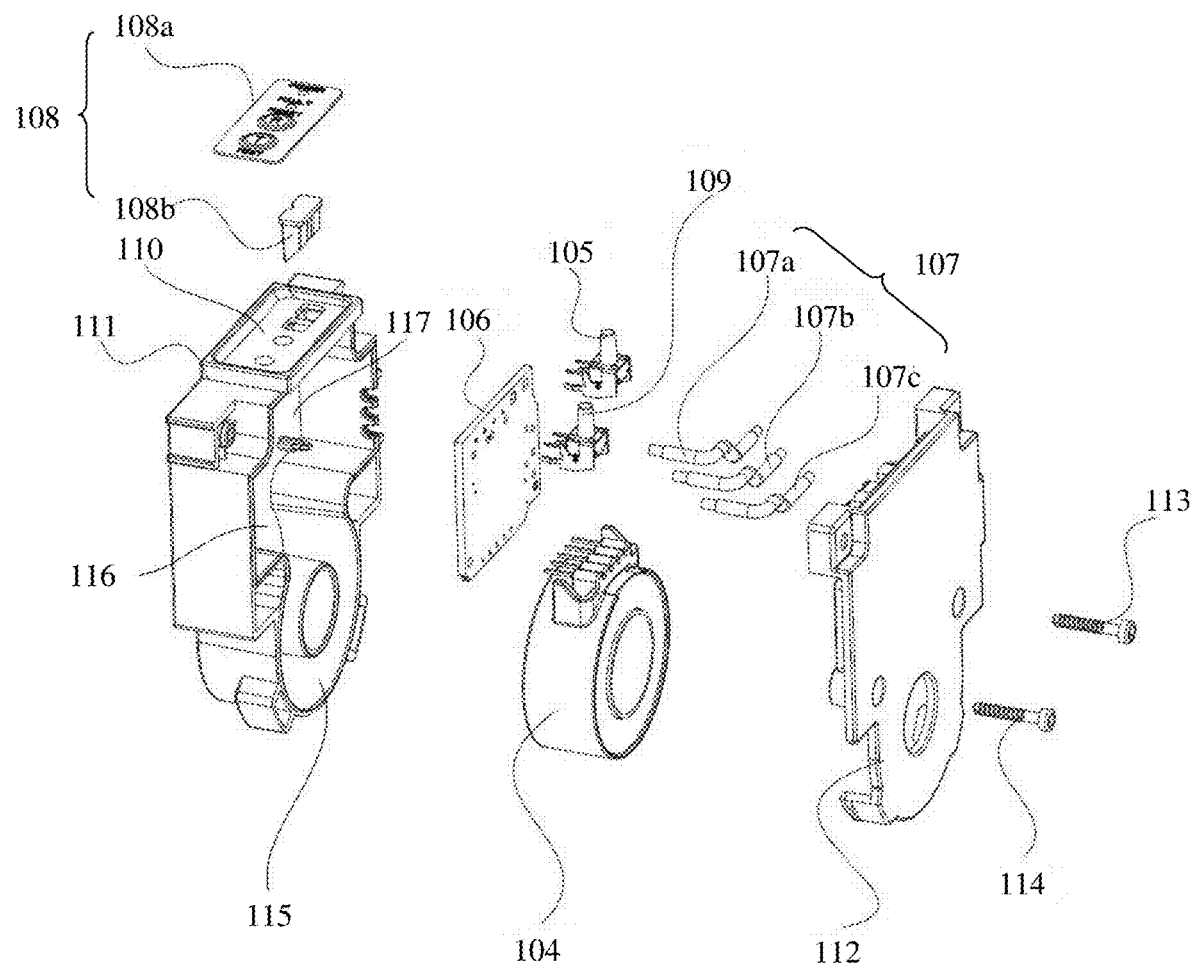
FIG. 6 illustrates a ground fault detection device corresponding to the embodiments of FIGS. 1A and 1C.

FIG. 6 is an exploded view of a ground fault detection device 1C according to an embodiment of the present invention. The ground fault detection device 1C includes a ground fault signal detection module 104, a ground fault signal simulation module 105, a ground fault signal processing module 106, and a grounded power input module 107. The ground fault signal processing module 106 is coupled to the ground fault signal detection module 104 and grounded power input module 107.

The ground fault detection device 1C includes a ground fault signal detection module 104, a ground fault signal simulation module 105, a ground fault signal processing module 106, and a ground power input module 107. The grounding fault detection device 1C includes a shell (outer housing), which includes a base 111 and a cover plate 112 coupled to the base 111. For example, the cover plate 112 may cover the base 111, and the base 111 and cover plate 112 may be securely connected together through fasteners 113, 114 (such as screws, etc.). The base 111 may include a first cavity area 115 for accommodating the ground fault signal detection module 104, a second cavity area 116 for accommodating the ground fault signal processing module 106, a third cavity area 117 for accommodating the ground power input module 107, and a window area 110 for accommodating the ground fault signal simulation module 105. The first cavity area 115 may be located in the lower part of the shell (specifically, the base 111) and is a circular cavity to adapt to the shape and size of the ground fault signal detection module 104. The first cavity area 115, which accommodates the ground fault signal detection module 104, surrounds the detector coil opening 19 which is exposed to the exterior of the ground fault detection device 1C to allow the power supply lines 21, 22 and 23 to pass through when the ground fault circuit interrupter is installed (see FIGS. 9B, 10B, 11C; the detector coil opening can also be seen in FIGS. 2B, 3A-3C, 7A-8C, 12A-12B and 13). The third cavity area 117 may be located on one side of the shell (specifically, the base 111) and has an opening to allow the grounded power input module 107 to pass. The second cavity area 116 may be located in the middle of the shell (specifically, the base 111), between the first cavity area 115 and the third cavity area 117.

The ground fault signal detection module 104 may include at least one detection coil for detecting ground fault signals at the output. Upon detecting the ground fault signal, the ground fault signal detection module 104 provides corresponding data to the ground fault signal processing module 106. The ground fault signal processing module 106 compares the received data with pre-set parameters. For example, if the data is smaller than the pre-set parameter, it does not drive the shunt module 3C to act; if the data is greater than the pre-set parameter, it drives the shunt module 3C to act. In other words, driving the shunt module 3C to act may be based on the comparison of data received from the ground fault signal detection module 104 and the pre-set parameter. The action of the shunt module 3C drives the circuit breaker 2C to disconnect the power connection between the input and output ends.

The ground fault signal simulation module 105 may include at least one test button. When the test button is manually pressed, the ground fault signal simulation module 105 generates a simulated ground fault signal. In response to the simulated ground fault signal generated by the ground fault signal simulation module 105, corresponding data is provided to the ground fault signal processing module 106. The ground fault signal processing module 106 compares the received data with pre-set parameters. For example, if the data is smaller than the pre-set parameter, it does not drive the shunt module 3C to act; if the data is greater than the pre-set parameter, it drives the shunt module 3C to act. In other words, driving the shunt module 3C to act may be based on the comparison of data received from the ground fault signal detection module 104 and the pre-set parameter. The action of the shunt module 3C drives the circuit breaker 2C to disconnect the power connection between the input and output ends.

The grounding power input module 107 may supply a working power for the grounding fault signal processing module 106. As shown in FIG. 6, the grounded power input module 107 may include wires 107a~107c.

The ground fault detection device 1C may further include a fault display module 108 for providing alarm indication in the event of a ground fault. As shown in FIG. 6, the fault display module 108 may include a face panel 108a and a light guide column 108b. The light guide column 108b is disposed on the upper end of the base 111; the face panel 108a is disposed on the light guide column 108b and the upper end of the base 111, and is fixed to the base 111.

The grounding fault detection device 1C may further include a fault detection reset module 109, which includes a reset button for clearing alarm indications. For example, after the circuit breaker 2C disconnects the power connection between the input and output end, and the fault is eliminated, the power connection between the input and output ends needs to be reconnected. Therefore, after eliminating the fault, the fault detection reset module 109 is used to reset the ground fault detection device 1C, before the circuit breaker 2C can be operated to reestablish the electrical connection between the input and output ends.

As shown in FIG. 6, the window area 110 may be located at the upper end outside the shell (specifically, the base 111), and is configured to accommodate the fault display module 108, at least a portion of the ground fault signal simulation module 105 (such as the buttons, etc.), and at least a portion of the fault detection reset module 109 (such as the buttons, etc.).

The ground fault signal processing module 106 includes a printed circuit board (PCB), where the ground fault signal simulation module 105, the fault detection reset module 109, the grounded power input module 107, and the ground fault signal detection module 104 may be connected (for example, through soldering, etc.) to the printed circuit board.

Figure 7A:
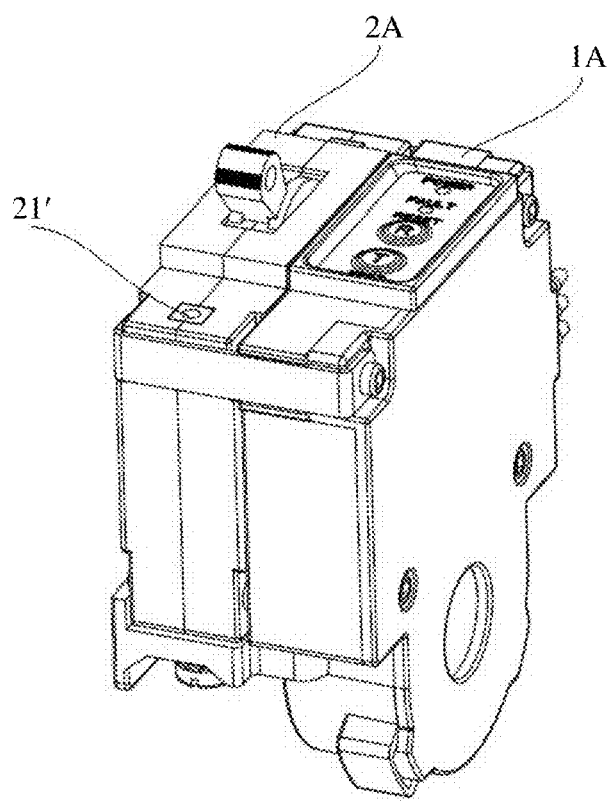
FIG. 7A is an exterior view of a ground fault circuit interrupter corresponding to the embodiment of FIG. 1A.
Figure 7B:
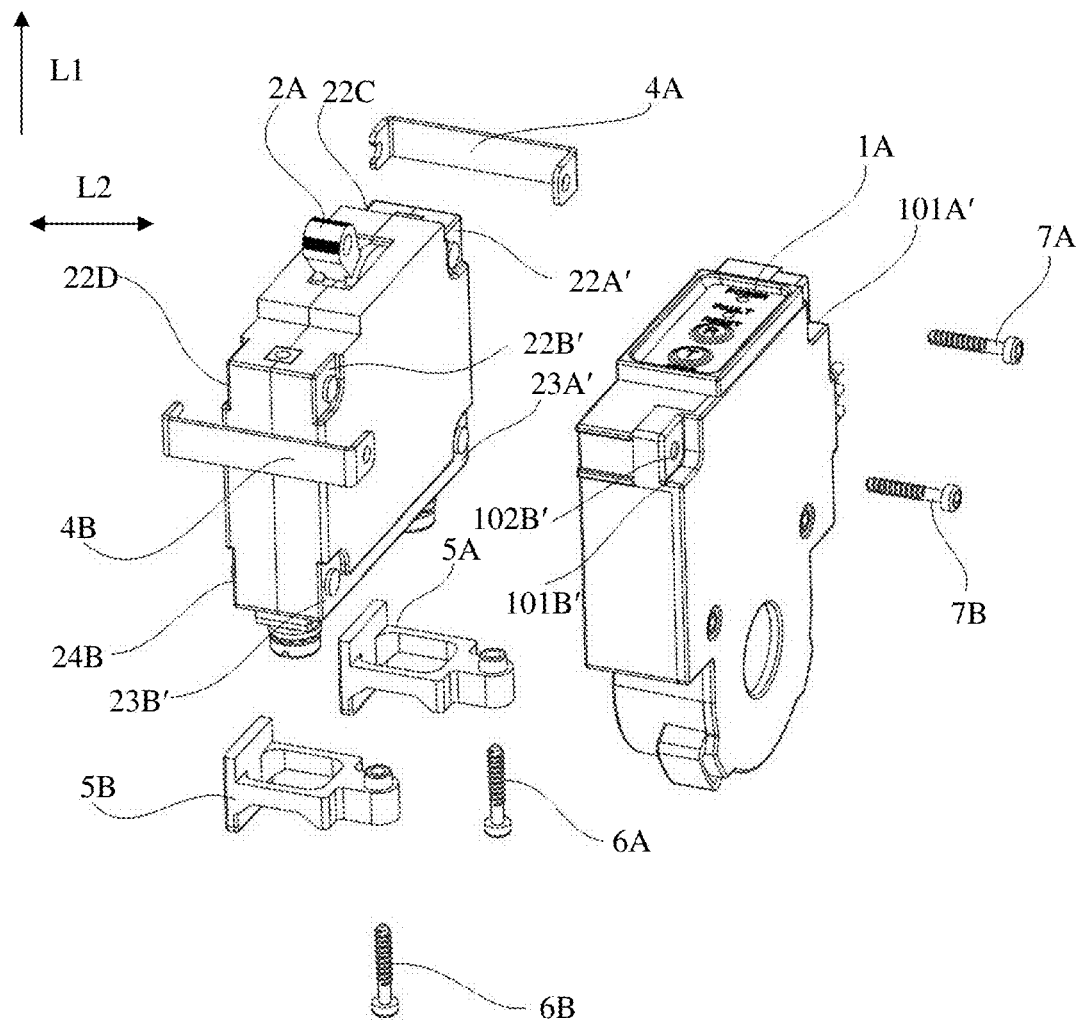
FIG. 7B is an exploded view of the ground fault circuit interrupter of FIG. 7A.

FIG. 7A is an exterior view of the ground fault circuit interrupter 10A corresponding to FIG. 1A, according to an embodiment of the present invention. FIG. 7B is an exploded view of the ground fault circuit interrupter 10A of FIG. 7A from one viewing angle, and FIG. 7C is an exploded view of the ground fault circuit interrupter 10A of FIG. 7A from another viewing angle.

Figure 7C:
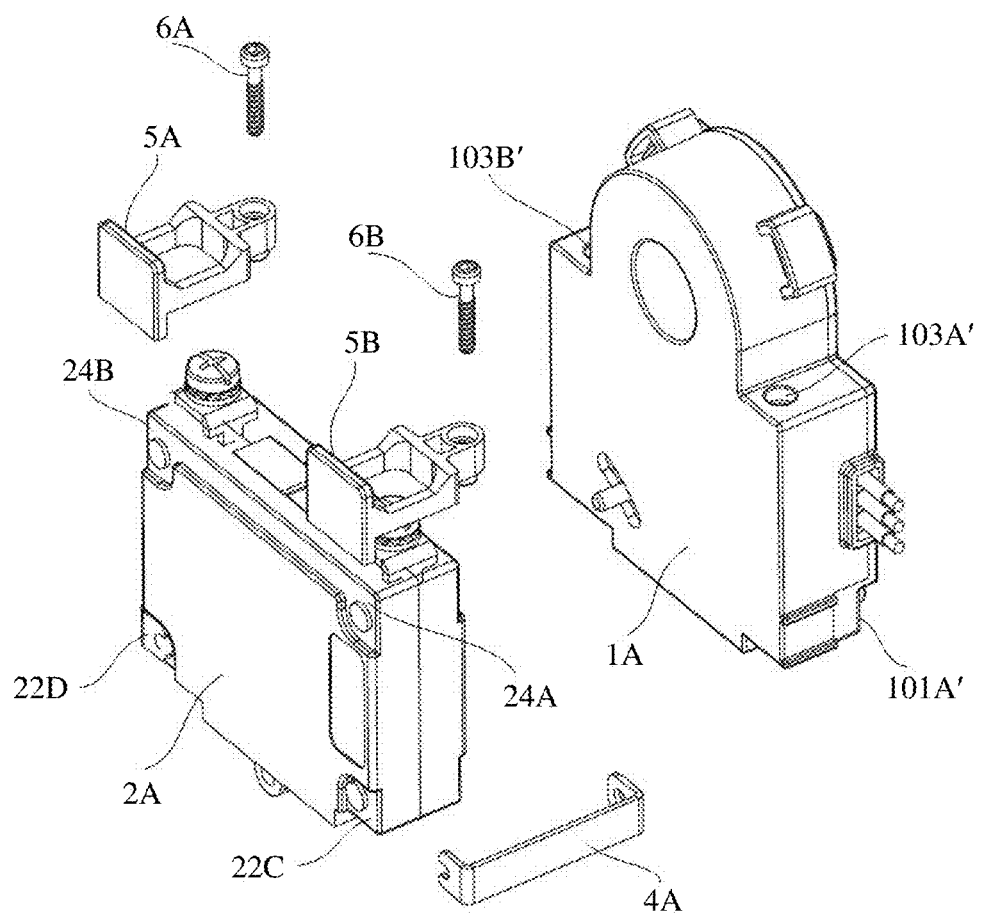
FIG. 7C is an exploded view of the ground fault circuit interrupter of FIG. 7A from another viewing angle.

As shown in FIGS. 7A to 7C, device 10A includes a fastening device, which fastens the ground fault detection device 1A and the circuit breaker 2A to each other. For example, the fastening device may include one or more first fasteners 4A and 4B, and/or second fasteners 5A and 5B (see FIGS. 4 and 5).

Different from FIGS. 3A to 3C, in FIGS. 7A to 7C, the first end 43 of each first fastener (4A, 4B) is not clamped to the recesses (22A', 22B') of the circuit breaker 2C, but rather to the recesses (22C, 22D) on the other side of the circuit breaker 2C, and the second end 44 of each first fastener (4A, 4B) is fixedly connected to the ground fault detection device 1A, to limit the relative movement of the circuit breaker 2A (which has the shunt module 3A integrated within it) and ground fault detection device 1A in the first direction. The recesses (22C, 22D) of the circuit breaker 2A may be located on the side of the circuit breaker 2A (for example, near the top surface) and not adjacent to the ground fault detection device 1A. The notch 45 provided at the first end 43 of each first fastener (4A, 4B) may be adapted to the shape of the recesses (22C, 22D). Similar to FIGS. 3A to 3C, the second end 44 of each first fastener (4A, 4B) in FIGS. 7A to 7C may be located, for example, in the recesses (101A', 101B') of the ground fault detection device 1A (for example, the recesses are located on the side of the ground fault detection device 1A and not adjacent to the circuit breaker 2A), so that the opening 46 of the second end 44 exposes the fixing hole (such as the hole 102B', and the hole opposite to hole 102B' (not shown)) in the recesses (101A', 101B'). The fixing component (7A, 7B) passes through the opening 46 of the second end 44 and is inserted into the fixing hole of the ground fault detection device 1A, in a manner similar to that of the embodiment in FIG. 3A to 3C described earlier, and further descriptions are omitted here.

As described above, the first end of the first fastener is clamped to the circuit breaker 2A, and the second end of the first fastener is fixed to the ground fault detection device 1A, thereby preventing relative movement of the ground fault detection device 1A and the circuit breaker 2A in the first direction, such as a left-and-right movement (as indicated by the left-and-right arrow L2) and an upward movement (as indicated by the upward arrow L1).

Different from FIGS. 3A to 3C, in FIGS. 7A to 7C, the first end 51 of each second fastener (5A, 5B) is not clamped to the recesses (23A', 23B') of the circuit breaker 2A, but rather to the recesses (24A, 24B) on the other side of the circuit breaker 2A, and the second end 52 of each second fastener (5A, 5B) is fixedly connected to the ground fault detection device 1A, to limit the relative movement of the circuit breaker 2A and ground fault detection device 1A in the second direction. The recesses (24A, 24B) of the circuit breaker 2A may be located on the side of the circuit breaker 2A (for example, near the bottom surface) and not adjacent to the ground fault detection device 1A. Similar to FIGS. 3A to 3C, in FIGS. 7A to 7C, the second end 52 of each second fastener (5A, 5B) is fixedly connected to the ground fault detection device 1A by corresponding fixing component (6A, 6B), which passes through the opening of the second end 52 and is inserted into the fixing hole of the ground fault detection device 1A (such as the hole 103A', and the hole 103B' opposite to the hole 103A'), in a manner similar to that of FIG. 3A to FIG. 3C, and further descriptions are omitted here.

As described above, the first end of the second fastener is clamped together with the circuit breaker 2A, and the second end of the second fastener is fixed together with the ground fault detection device 1A, thereby preventing the relative movement of the ground fault detection device 1A and the circuit breaker 2A in the second direction, such as the downward movement (such as in the opposite direction to the upward direction L1).

The ground fault detection device 1A may have components and structures similar to those of the ground fault detection device 1C of FIG. 6, and further descriptions are omitted here.

Similar to FIG. 3A, the circuit breaker 2A includes at least one installation device 21'. The installation device 21' may be disposed at the top surface of the circuit breaker 2A. For example, the circuit breaker 2A, and the ground fault detection 1A fixedly connected to it, may be fixedly connected to a face plate by the installation device 21', to expose at least the operating and display parts of the circuit breaker 2A and the ground fault detection 1A (such as electrical switches, fault indicators, analog buttons, reset buttons, etc.). Similarly, the ground fault detection module 1A may include at least one installation device.

Figure 8A:
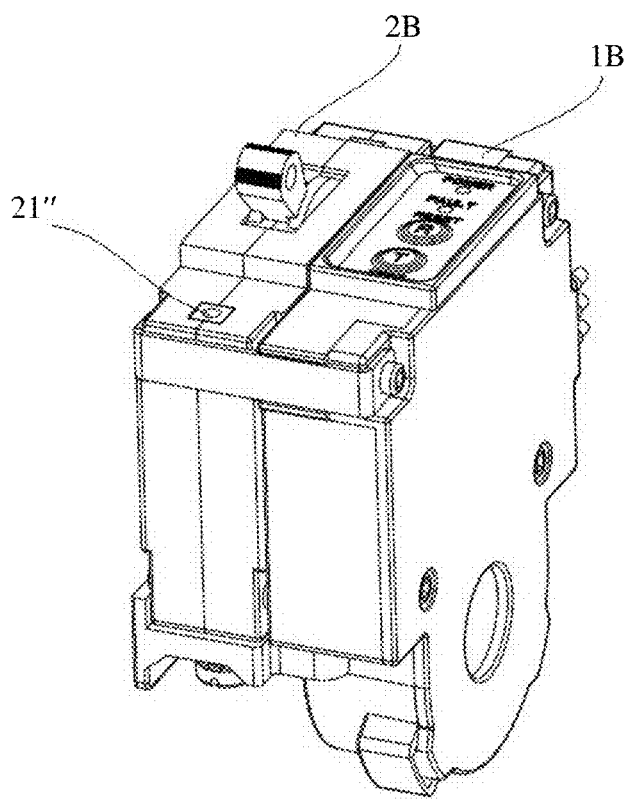
FIG. 8A is an exterior view of a ground fault circuit interrupter corresponding to the embodiment of FIG. 1B.
Figure 8B:
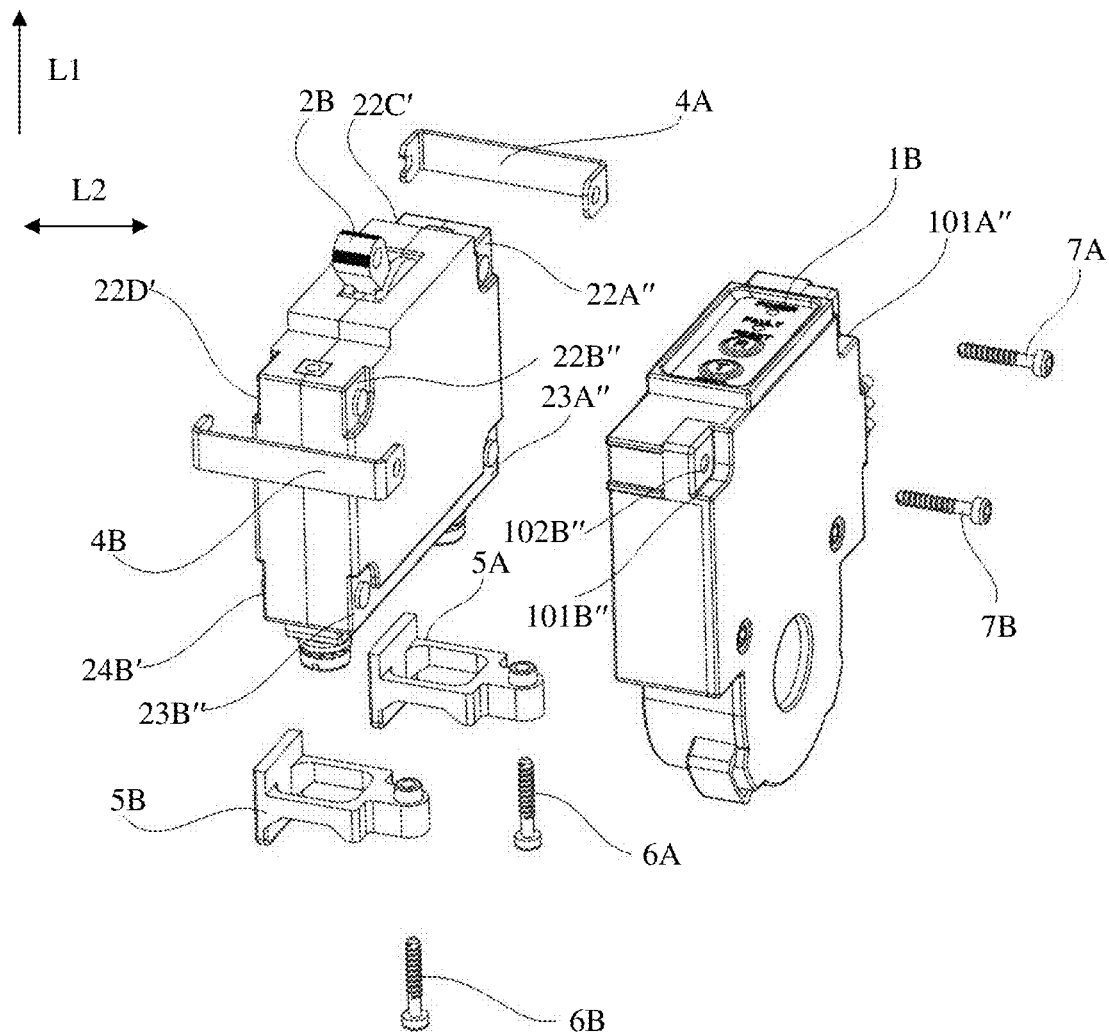
FIG. 8B is an exploded view of the ground fault circuit interrupter of FIG. 8A.

FIG. 8A is an exterior view of the ground fault circuit interrupter 10B corresponding to FIG. 1B, according to an embodiment of the present invention. FIG. 8B is an exploded view of the ground fault circuit interrupter 10B of FIG. 8A from one viewing angle, and FIG. 8C is an exploded view of the ground fault circuit interrupter 10B of FIG. 8A from another viewing angle.

Figure 8C:
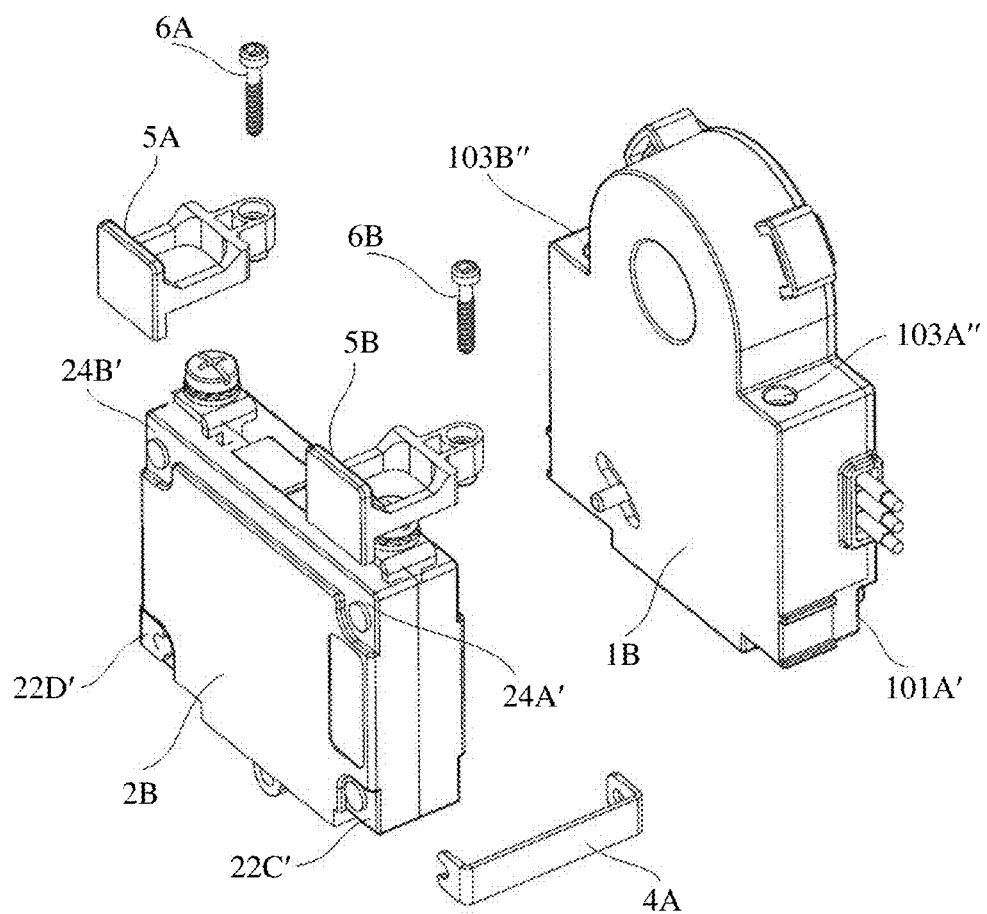
FIG. 8C is an exploded view of the ground fault circuit interrupter of FIG. 8A from another viewing angle.

As shown in FIGS. 8A to 8C, device 10B includes a fastening device, which fastens the ground fault detection device 1B and the circuit breaker 2B to each other. For example, the fastening device may include one or more first fasteners 4A and 4B, and/or second fasteners 5A and 5B (see FIGS. 4 and 5).

Similar to FIGS. 7A to 7C, in FIGS. 8A to 8C, the first end 43 of each first fastener (4A, 4B) is not clamped to the recesses (22A", 22B") of the circuit breaker 2B, but rather to the recesses (22C', 22D') on the other side of the circuit breaker 2B, and the second end 44 of each first fastener (4A, 4B) is fixedly connected to the ground fault detection device 1B, to limit the relative movement of the circuit breaker 2B and ground fault detection device 1B (which has the shunt module 3B integrated within it) in the first direction. The recesses (22C', 22D') of the circuit breaker 2B may be located on the side of the circuit breaker 2B (for example, near the top surface) and not adjacent to the ground fault detection device 1B. The notch 45 provided at the first end 43 of each first fastener (4A, 4B) may be adapted to the shape of the recesses (22C', 22D'). Similar to FIGS. 3A to 3C, the second end 44 of each first fastener (4A, 4B) in FIGS. 8A to 8C may be located, for example, in the recesses (101A", 101B") of the ground fault detection device 1B (for example, the recesses are located on the side of the ground fault detection device 1B and not adjacent to the circuit breaker 2B), so that the opening 46 of the second end 44 exposes the fixing hole (such as the hole 102B", and the hole opposite to hole 102B" (not shown)) in the recesses (101A", 101B"). The fixing component (7A, 7B) passes through the opening 46 of the second end 44 and is inserted into the fixing hole of the ground fault detection device 1B, in a manner similar to that of the embodiment in FIG. 3A to 3C described earlier, and further descriptions are omitted here.

As described above, the first end of the first fastener is clamped to the circuit breaker 2B, and the second end of the first fastener is fixed to the ground fault detection device 1B, thereby preventing relative movement of the ground fault detection device 1B and the circuit breaker 2B in the first direction, such as a left-and-right movement (as indicated by the left-and-right arrow L2) and an upward movement (as indicated by the upward arrow L1).

Similar to FIGS. 7A to 7C, in FIGS. 8A to 8C, the first end 51 of each second fastener (5A, 5B) is not clamped to the recesses (23A", 23B") of the circuit breaker 2B, but rather to the recesses (24A', 24B') on the other side of the circuit breaker 2B, and the second end 52 of each second fastener (5A, 5B) is fixedly connected to the ground fault detection device 1B, to limit the relative movement of the circuit breaker 2B and ground fault detection device 1B in the second direction. The recesses (24A', 24B') of the circuit breaker 2B may be located on the side of the circuit breaker 2B (for example, near the bottom surface) and not adjacent to the ground fault detection device 1B. Similar to FIGS. 3A to 3C, in FIGS. 8A to 8C, the second end 52 of each second fastener (5A, 5B) is fixedly connected to the ground fault detection device 1B by corresponding fixing component (6A, 6B), which passes through the opening of the second end 52 and is inserted into the fixing hole of the ground fault detection device 1B (such as the hole 103A", and the hole 103B" opposite to the hole 103A"), in a manner similar to that of FIG. 3A to FIG. 3C, and further descriptions are omitted here. (Note that the mechanical linkage component of the ground fault detection device 1B is shown in FIG. 8C, but the corresponding mechanical linkage component of the circuit breaker 2B is not shown in FIG. 8B.)

As described above, the first end of the second fastener is clamped together with the circuit breaker 2B, and the second end of the second fastener is fixed together with the ground fault detection device 1B, thereby preventing the relative movement of the ground fault detection device 1B and the circuit breaker 2B in the second direction, such as the downward movement (such as in the opposite direction to the upward direction L1).

In addition to having the shunt module 3B integrated within it, the ground fault detection device 1B may have components and structures similar to those of the ground fault detection device 1C of FIG. 6, and further descriptions are omitted here.

It should be understood that the number of fasteners in FIGS. 3A to 8C is only for illustration and not limiting, and devices 10A-10C may include more or fewer fasteners. In addition, the circuit breakers 2A to 2C in FIGS. 3A to 8C are not limited to single-pole circuit breakers, but may also be multi-pole circuit breakers. Therefore, circuit breakers 2A to 2C include at least one-pole circuit breaker.

Figure 12A:
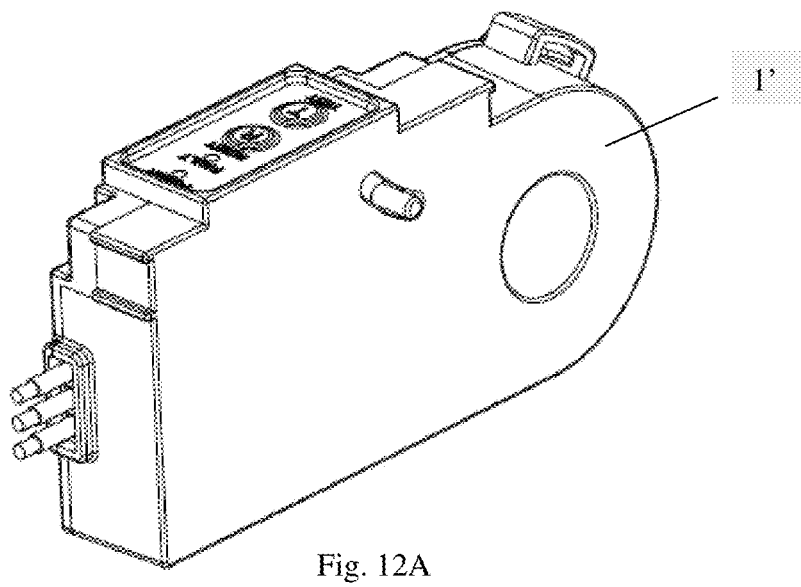
FIG. 12A is an exterior view of an alternative combination of the ground fault detection device according to alternative embodiments of the present invention.
Figure 12B:
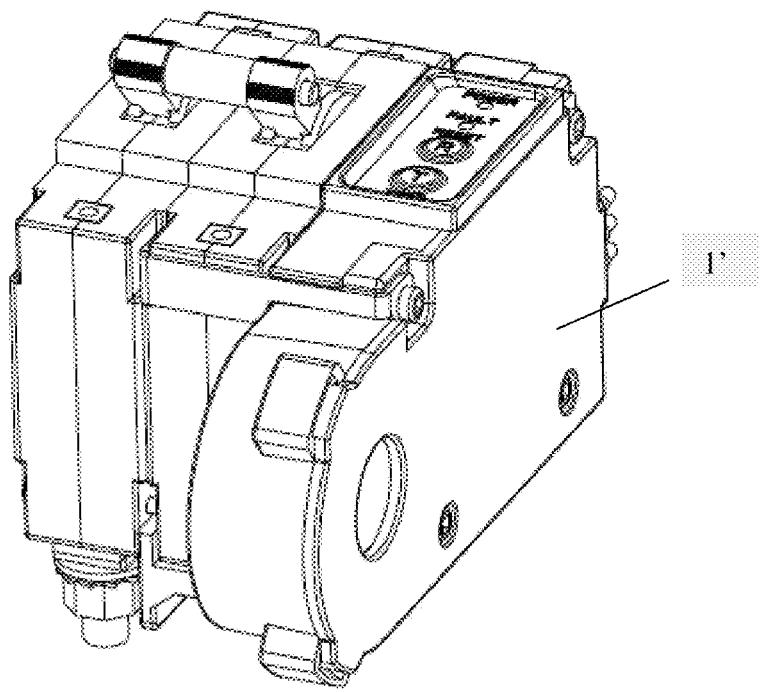
FIG. 12B is an exterior view of the alternative combination of the ground fault detection device of FIG. 12A joined together with a circuit breaker and a shunt module.

FIG. 12A is an exterior view of an alternative ground fault detection device 1', with or without a shunt module integrated within it. Compared to the ground fault detection device shown in FIG. 2B, in the ground fault detection device 1', the exterior detector coil opening 19 is located on a lateral side of the unit, rather than the bottom side. The internal structure of the ground fault detection device (see, e.g., FIG. 6) may be modified accordingly. FIG. 12B shows the ground fault detection device 1' of FIG. 12A joined together with a circuit breaker 2C and a shunt module 3C, similar to the combination shown in FIG. 3A. As mentioned earlier, the exterior opening 19 allows the power supply lines to pass through the detection coil when the ground fault circuit interrupter is installed; the opening 19 may be located at any suitable location as long as it clears the exterior housing of the circuit breaker and the shunt module when the two or three modules are arranged side by side and affixed together, so that the power supply lines can pass through the opening 19.

Figure 13:
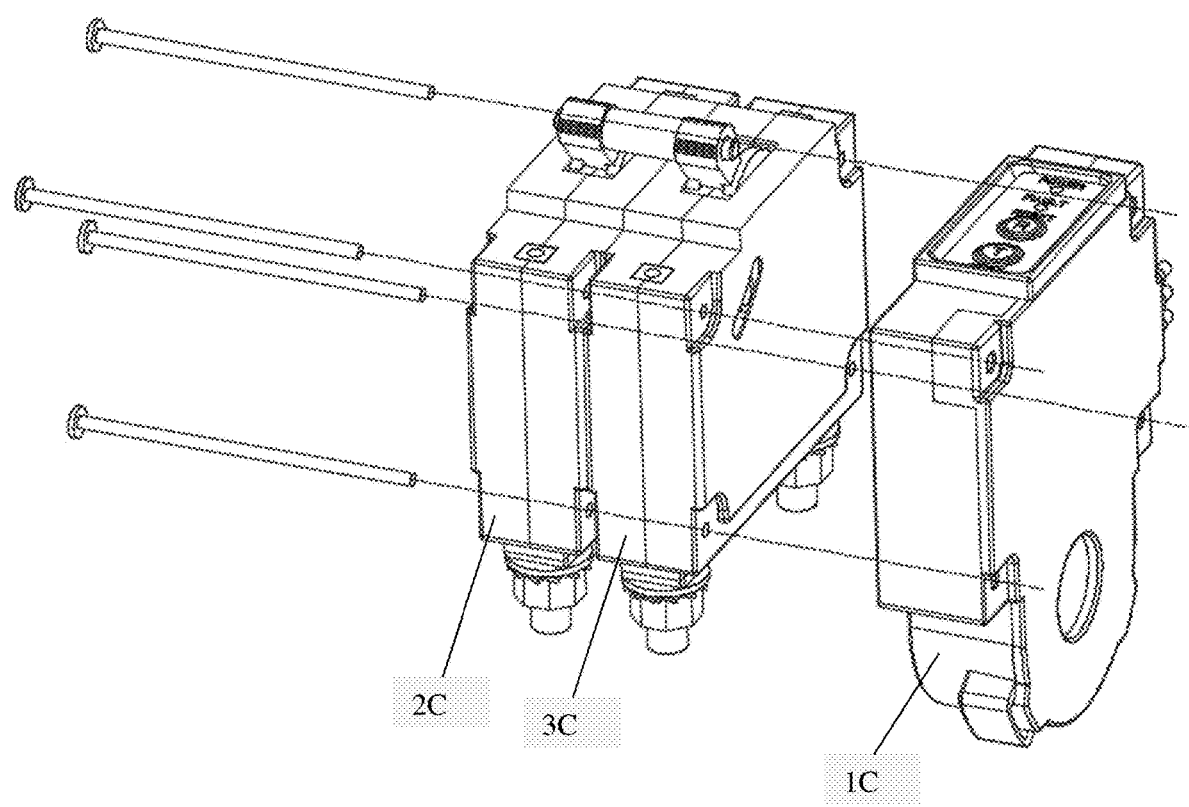
FIG. 13 illustrates alternative structures for joining the units of the ground fault circuit interrupter together according to another embodiment of the present invention.

FIG. 13 illustrates an alternative structure for joining the units of the ground fault circuit interrupter together according to another embodiment of the present invention. In lieu of the fasteners 4A, 4B, 5A and 5B described in the embodiments of FIGS. 3A-5B and 7A-8C, the ground fault detection device 1C, circuit breaker 2C and shunt module 3C placed side-by-side are joined together using long bolts that pass through the holes located at the four corners of all the units. Other suitable mechanical structures may be employed to join the units of the ground fault circuit interrupter together, and the invention is not limited to the particular structures of such mechanical structures.

Figure 14A:
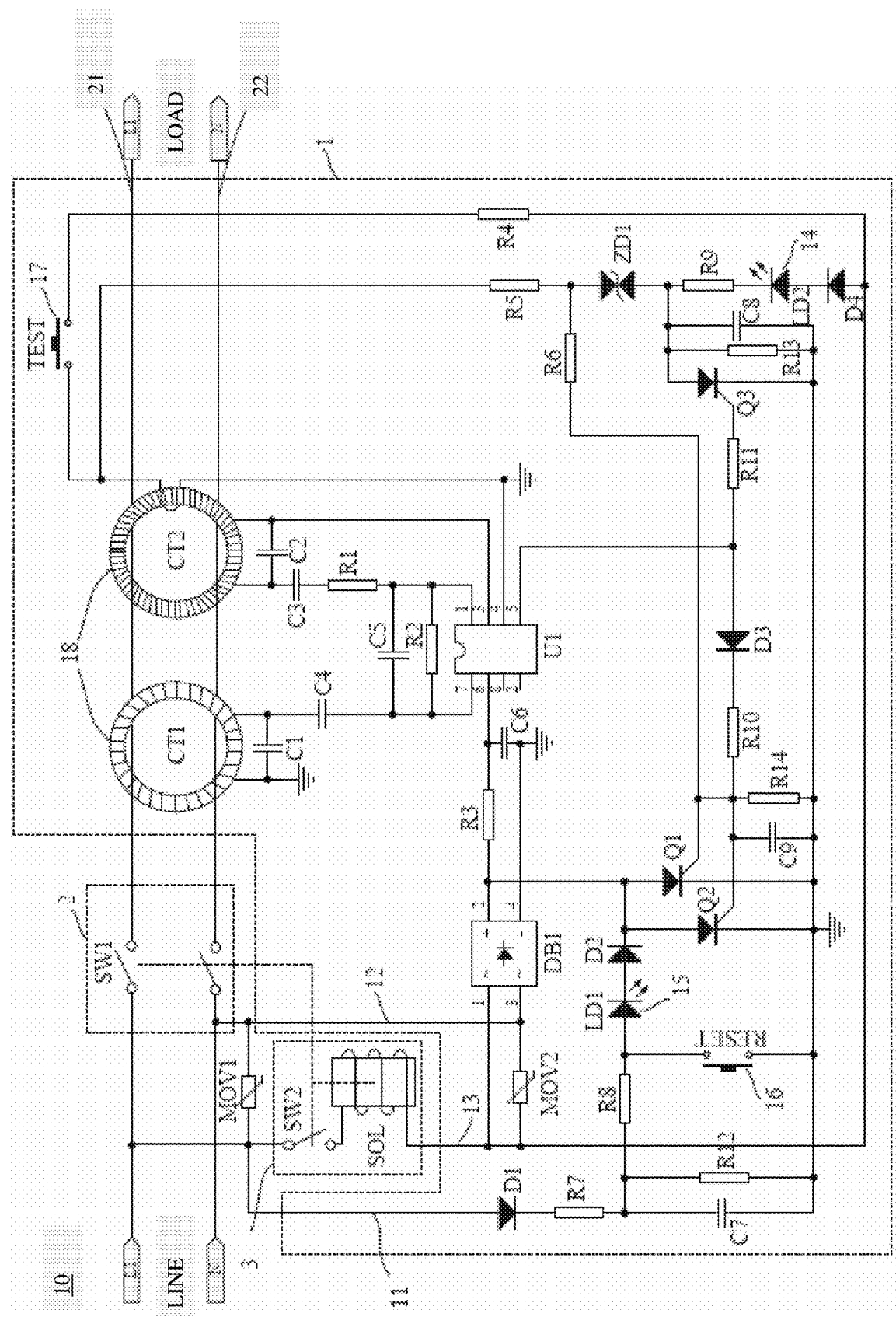
FIGS. 14A and 14B are circuit diagrams of the circuit breaker, the shunt module, and the ground fault detection device corresponding to the embodiments of FIGS. 1A, 1B and 1C.

FIG. 14A is a circuit diagram of a ground fault circuit interrupter device 10 that includes a circuit breaker 2, a shunt module 3, and a ground fault detection circuit 1 according to embodiments of the present invention. This circuit diagram corresponds to all embodiments of FIGS. 1A, 1B and 1C. The ground fault detection circuit 1 is coupled to the first and second power supply lines 21 and 22 via conductors 11 and 12, respectively. It is further coupled to the shunt module 3 via conductor 13. When the ground fault detection circuit 1 is energized and functions normally, the power supply indicator light 14 is illuminated. When the first or second power supply line 21 or 22 has a leakage current, the magnetic detector coil module 18 detects the leakage current, and the detected signal is processed by a processor chip U1 and other components of the ground fault detection circuit 1 to generate a drive current on conductor 13 to drive the shunt module (solenoid) 3, as well as to turn on the warning indicator light 15 at the same time. The solenoid 3 drives the circuit breaker (switch) 2 to disconnect power between the input and output ends of the power supply lines 21 and 22. When the circuit breaker 2 needs to be reset, the reset button 16 of the ground fault detection device 1 (see also FIG. 9B) is depressed first to extinguish the warning indicator light 15, then the push handle 25 of the circuit breaker 2 is pushed to reset the circuit breaker 2 (i.e. to close the switch 24).

The circuit 10 is further provided with a manual test function. When the test button 17 (see also FIG. 9B) is depressed, a test current loop is formed to simulate a ground fault. At this time, if the ground fault circuit interrupter 10 is functioning normally, the ground fault detection circuit 1 generates a drive current for the shunt module 3 on conductor 13, which in turn drives the circuit breaker 2 to disconnect electric power between the input and output ends of power supply lines 21 and 22. Conversely, if the circuit breaker 2 does not disconnect electric power in response to the test button 17 being depressed, it indicates that the ground fault circuit interrupter 10 is not functioning normally and needs to be replaced.

As indicated earlier, the circuit 10 can be used to implement the embodiments of FIGS. 1A, 1B and 1C. When the shunt module 3 is integrated inside the ground fault detection device 1, conductor 13 is internal to the ground fault detection device 1, and only two conductors 11 and 12 lead out of the ground fault detection device 1 (see FIG. 10B).

Figure 14B:
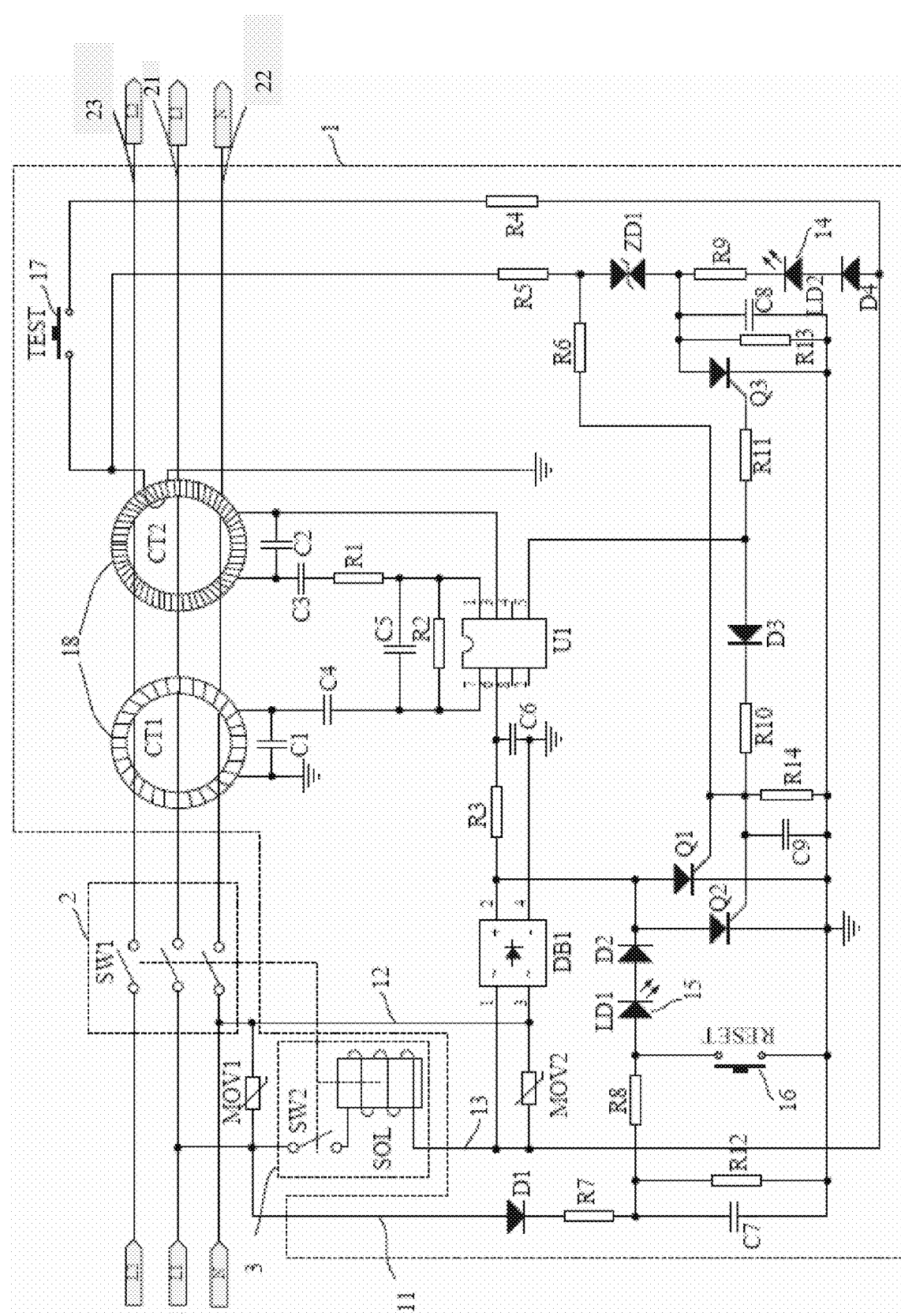

FIG. 14B is a circuit diagram of an alternative ground fault circuit interrupter device 20. The circuit 20 is similar to the circuit 10 of FIG. 14A, except that the power supply lines have three lines 21, 22 and 23, and correspondingly, the switch 2 is a three-pole switch.

In embodiments of the present invention, a ground fault detection device and a circuit breaker are combined together using a fastening device, which not only ensures user safety (such as in high current scenarios), but also provides flexibility during installation and use. For example, the outer shell of the circuit breaker and the outer shell of the separate shunt module may have the same structure (such as size, arrangement of the recesses, etc.), allowing the same fastening devices (such as the first fasteners and the second fasteners) to be used for various combinations of the shunt module, the circuit breaker, and the ground fault detection device (as described above), thereby providing flexibility during installation and use.

While the present invention is described above using specific examples, these examples are only illustrative and do not limit the scope of the invention. It will be apparent to those skilled in the art that various modifications, additions and deletions can be made to the embodiments described above without departing from the spirit or scope of the invention.

The invention claimed is:

1. A ground fault circuit interrupter, comprising:
a circuit breaker, configured to connect and disconnect an electrical connection between an input end and an output end of a plurality of power supply lines;
a shunt module, coupled to the circuit breaker and configured to drive the circuit breaker to disconnect the electrical connection;
a ground fault detection device, coupled to the shunt module, having a detector coil opening on its exterior housing configured to accommodate the power supply lines to pass through the detecor coil opening without entering the exterior housing of the ground fault detection device, wherein the ground fault detection device is configured to detect a ground fault signal on the output end of the power supply lines and to output a control signal to the shunt module in response to detecting the ground fault signal, wherein the shunt module is configured to drive the circuit breaker to disconnect the electrical connection in response to the control signal; and
at least one fastening device configured to join the ground fault detection device and the circuit breaker to each other.

2. The ground fault circuit interrupter of claim 1, wherein the circuit breaker defines a top side, and wherein the detector coil opening is located near a bottom side opposite the top side, or located on a lateral side between the top and bottom sides.

3. The ground fault circuit interrupter of claim 1, wherein the at least one fastening device includes one or more bolts configured to affix the fault detection device and the circuit breaker to each other.

4. The ground fault circuit interrupter of claim 1, wherein the at least one fastening device includes one or more first fasteners, each first fastener having a first end clamped to a first recess of the circuit breaker, and a second end fixedly connected to the ground fault detection device, configured to limit relative movements of the circuit breaker and the ground fault detection device in a first direction.

5. The ground fault circuit interrupter of claim 4, wherein the at least one fastening device further includes one or more second fasteners, each second fastener having a first end clamped to a second recess of the circuit breaker, and a second end fixedly connected to the ground fault detection device, configured to limit relative movements of the circuit breaker and the ground fault detection device in a second direction.

6. The ground fault circuit interrupter of claim 1, wherein the shunt module is integrated inside an exterior housing of the circuit breaker.

7. The ground fault circuit interrupter of claim 1, wherein the shunt module is integrated inside the exterior housing of the ground fault detection device.

8. The ground fault circuit interrupter of claim 1, wherein the shunt module is a separate module having an exterior housing separate from an exterior housing of the circuit breaker and the exterior housing of the ground fault detection device.

9. The ground fault circuit interrupter of claim 1, wherein the ground fault detection device includes a fault display module configured to generate an alarm indication in response to detecting the ground fault signal.

10. The ground fault circuit interrupter of claim 9, wherein the ground fault detection device further includes a fault detection reset module, which includes a reset button for clearing the alarm indication.

11. The ground fault circuit interrupter of claim 9, wherein the ground fault detection device further includes a ground fault signal detection module, a ground fault signal simulation module, a ground fault signal processing module, and a grounded power input module.

12. The ground fault circuit interrupter of claim 11, wherein the ground fault signal simulation module includes at least one test button, configured to generate a simulated ground fault signal in response to the test button being manually pressed.

13. The ground fault circuit interrupter of claim 11, wherein the ground fault signal processing module includes a printed circuit board, wherein in response to detecting the ground fault, the ground fault signal processing module controls the shunt module to drive the circuit breaker to disconnect the electrical connection.

14. The ground fault circuit interrupter of claim 11, wherein the grounded power input module is configured to supply a working power for the grounding fault signal processing module.

15. The ground fault circuit interrupter of claim 11, wherein the exterior housing of the ground fault detection device includes:
a cover plate; and
a base coupled to the cover plate, the base defining:
    a first cavity area configured to accommodate the ground fault signal detection module;
    a second cavity area configured to accommodate the ground fault signal processing module;
    a third cavity area configured to accommodate the ground power input module; and
    a window area configured to accommodate the fault display module and the ground fault signal simulation module.

16. The ground fault circuit interrupter of claim 11, wherein the ground fault signal detection module includes at least one detection coil configured to detect the ground fault signals.

17. The ground fault circuit interrupter of claim 1, wherein the circuit breaker is single-pole or multi-pole circuit breaker.

18. The ground fault circuit interrupter of claim 1, wherein the circuit breaker includes at least one installation device.

* * * * *